United States Patent [19]
Nomura

[11] Patent Number: 6,128,573
[45] Date of Patent: Oct. 3, 2000

[54] MAP DATABASE APPARATUS

[75] Inventor: Takashi Nomura, Chigasaki, Japan

[73] Assignee: Xanavi Informatics Corporation, Kanagawa-ken, Japan

[21] Appl. No.: 08/956,025

[22] Filed: Oct. 22, 1997

[30] Foreign Application Priority Data

Oct. 22, 1996 [JP] Japan .................................. 8-279685
Jan. 22, 1997 [JP] Japan .................................. 9-009670

[51] Int. Cl.[7] .............................. G01C 21/00; G06G 7/78
[52] U.S. Cl. .......................................... 701/208; 701/212
[58] Field of Search .................................. 701/208, 212, 701/200, 201; 342/451; 340/995

[56] References Cited

U.S. PATENT DOCUMENTS 5,031,104  7/1991  Ikeda et al. ............................. 340/995
5,285,391  2/1994  Smith, Jr. et al. ...................... 340/995
5,523,765  6/1996  Ichikawa ................................ 342/451

FOREIGN PATENT DOCUMENTS 0 706 031  4/1996  European Pat. Off. .
0706 031  4/1996  European Pat. Off. .

OTHER PUBLICATIONS

Article entitled Digital Road Map Data Base for Vehicle Navigation and Road Information Systems by Shunichiro Kamijo et al., pp. 319–323.

Primary Examiner—Gregory C. Issing
Attorney, Agent, or Firm—Evenson, McKeown, Edwards & Lenahan, PLLC

[57] ABSTRACT

A map database apparatus according to the present invention stores a plurality of sets of link string data provided separately to correspond to maps at different scales representing a road as a link string constituted by connecting a plurality of links each having a node at a front end and a rear end thereof. In the map database apparatus, a level correlation link number is provided as data that indicate a link string in a lower order level at a larger scale that is common to a link in a higher order level at a smaller scale, the level correlation link number having a level number of the higher order level and a link number of the common link in the higher order level.

5 Claims, 30 Drawing Sheets

FIG. 4

| ITEM NUMBER | ITEM NAME | | | OFFSET | DATA FORMAT | DATA LENGTH (WORD) |
|---|---|---|---|---|---|---|
| 1 | LINK STRING 1 | LINK STRING INFORMATION | LINK STRING SIZE | 0 | BINARY | 1 |
| 2 | | | NUMBER OF ELEMENT POINTS | 1 | ↑ | 1 |
| 3 | | | LINK ATTRIBUTE | 2 | ↑ | 1 |
| 4 | | | ROAD NAME OFFSET | 3 | ↑ | 1 |
| 5 | | | ROAD NUMBER | 4 | ↑ | W1 |
| 6 | | | LEVEL CORRELATION LINK NUMBER | | | W2 |
| 7 | | NODE LINK INFORMATION | ATTRIBUTE 1 + X COORDINATE | | ↑ | 1 |
| 8 | | | ATTRIBUTE 2 + Y COORDINATE | | ↑ | 1 |
| 9 | | | (IDENTICAL NODE OFFSET) | | ↑ | 1 |
| 10 | | | (GUIDE OFFSET) | | ↑ | 1 |
| 11 | | | (LINK NUMBER) | | ↑ | 1 |
| 12 | | | ... | | | |
| 13 | | | ATTRIBUTE 1 + X COORDINATE | | ↑ | 1 |
| 14 | | | ATTRIBUTE 2 + Y COORDINATE | | ↑ | 1 |
| 15 | | | (IDENTICAL NODE OFFSET) | | ↑ | 1 |
| 16 | | | (GUIDE OFFSET) | | ↑ | 1 |
| 17 | | | (LINK NUMBER) | | ↑ | 1 |
| 18 | | | ALTITUDE INFORMATION | | ↑ | 1 |
| 19 | | | ... | | | |
| 20 | | | ALTITUDE INFORMATION | | ↑ | 1 |
| 21 | ... | | | | | |
| 22 | LINK STRING n | LINK STRING INFORMATION | | | BINARY | W3 |
| 23 | | NODE LINK INFORMATION | | | ↑ | W4 |

W1∼W4 INDICATE VARIABLE DATA LENGTHS

FIG. 5B

| ITEM NUMBER | BIT | CONTENTS | | | | |
|---|---|---|---|---|---|---|
| 1 | 15~13 | NUMBER OF WORDS FOR CORRELATION LINK NO. | BIT 15 | BIT 14 | BIT 13 | MEANING |
| | | | 0 | 0 | 0 | 0 WORD (NO CORRELATION LINK NUMBER) |
| | | | 0 | 0 | 1 | SECURED FOR ONE WORD |
| | | | 0 | 1 | 0 | SECURED FOR TWO WORDS |
| | | | 0 | 1 | 1 | SECURED FOR THREE WORDS |
| | | | 1 | 0 | 0 | SECURED FOR FOUR WORDS |
| | | | 1 | 0 | 1 | SECURED FOR FIVE WORDS |
| | | | 1 | 1 | 0 | SECURED FOR SIX WORDS |
| | | | 1 | 1 | 1 | SECURED FOR SEVEN WORDS |
| 2 | 12~0 | NUMBER OF WORDS FOR LINK STRING | | | | |

FIG. 10 A

| ATTRIBUTE 1 + X COORDINATE |
|---|
| ATTRIBUTE 2 + Y COORDINATE |

(2 WORDS)

FIG. 10 B

| ATTRIBUTE 1 + X COORDINATE |
|---|
| ATTRIBUTE 2 + Y COORDINATE |
| IDENTICAL NODE OFFSET |

(3 WORDS)

FIG. 10 C

| ATTRIBUTE 1 + X COORDINATE |
|---|
| ATTRIBUTE 2 + Y COORDINATE |
| IDENTICAL NODE OFFSET |
| GUIDE OFFSET (OR LINK NO.) |

(4 WORDS)

FIG. 10 D

| ATTRIBUTE 1 + X COORDINATE |
|---|
| ATTRIBUTE 2 + Y COORDINATE |
| IDENTICAL NODE OFFSET |
| GUIDE OFFSET |
| LINK NO. |

(5 WORDS)

FIG. 11B

| BIT | DETAILS | |
|---|---|---|
| 15, 14 | OFFSET TO IMMEDIATLY PRECEDING | (1) 2 WORDS UP TO THE HEADER POSITION OF THE IMMEDIATELY PRECEDING ELEMENT POINT |
| | | (2) 3 WORDS UP TO THE HEADER POSITION OF THE IMMEDIATELY PRECEDING ELEMENT POINT |
| | | (3) 4 WORDS UP TO THE HEADER POSITION OF THE IMMEDIATELY PRECEDING ELEMENT POINT |
| | | (4) 5 WORDS UP TO THE HEADER POSITION OF THE IMMEDIATELY PRECEDING ELEMENT POINT |

FIG. 12B

| BIT | | DETAILS |
|---|---|---|
| 15 - 11 | ONE-WAY TRAFFIC | ① NO ONE-WAY ROAD |
| | | ② ONE-WAY TRAFFIC IN FORWARD DIRECTION *1 |
| | | ③ ONE-WAY TRAFFIC IN REVERSE DIRECTION *2 |
| | | ④ NO TRAFFIC IN BOTH DIRECTIONS *3 |
| | CLASSIFICATIONS OF WIDTHS *4 | ⑤ LESS THAN 5.5m OR NOT KNOWN |
| | | ⑥ 5.5 THROUGH 13m (OR ONE THROUGH 2 LANES) |
| | | ⑦ 13m OR MORE (OR THREE THROUGH 4 LANES) |
| | | ⑧ 5 THROUGH 6 LANES OR MORE |

*1   1-WAY TRAFFIC IN THE FORWARD DIRECTION MEANS THAT TRAVELING IS ALLOWED ONLY IN THE DIRECTION WHICH CONFORMS TO THE ORDER IN WHICH LINK STRING DATA POINTS ARISE.

*2   1-WAY TRAFFIC IN THE REVERSE DIRECTION MEANS THAT TRAVELING IS ALLOWED ONLY IN THE DIRECTION WHICH IS REVERSE FROM THE ORDER IN WHICH LINK STRING DATA POINTS ARISE.

*3   NO TRAFFIC ALLOWED IN BOTH DIRECTIONS MEANS THAT TRAVELING IS NOT ALLOWED EITHER IN THE DIRECTION CONFORMING TO THE ORDER IN WHICH THE LINK STRING DATA POINTS ARISE OR IN THE DIRECTION THAT IS REVERSE.

*4   THE TOTAL NUMBER OF LANES FOR BOTH FORWARD AND REVERSE DIRECTIONS IS INDICATED AS THE NUMBER OF LANES. WHEN FORWARD DIRECTION LANES AND REVERSE DIRECTION LANES ARE SEPARATED, THE NUMBER OF LANES IS INDICATED SEPARATELY FOR THE FORWARD DIRECTION AND REVERSE DIRECTION.

FIG. 13B

| ITEM NUMBER | BIT | CONTENTS | | | | |
|---|---|---|---|---|---|---|
| | | LEVEL NUMBER | BIT 15 | BIT 14 | BIT 13 | MEANING |
| 1 | 15~13 | | 0 | 0 | 0 | LEVEL 2 |
| | | | 0 | 0 | 1 | LEVEL 4 |
| | | | 0 | 1 | 0 | LEVEL 6 |
| | | | 0 | 1 | 1 | (THIS AND SUBSEQUENT SETTINGS UNDEFINED) |
| 2 | 12 | (RESERVED) | | | | |
| 3 | 11~0 | LINK NUMBER (1 ~ 4094) | | | | |

FIG. 15

| LEVEL | LINK STRING | LINK NUMBER | CORRELATION LINK NUMBER ||||||||| |
|---|---|---|---|---|---|---|---|---|---|---|
| | | | LEVEL | LINK NUMBER | LEVEL | LINK NUMBER | LEVEL | LINK NUMBER | LEVEL | LINK NUMBER |
| 6 | 1 | 1 | — | — | — | — | — | — | — | — |
| 4 | 1 | 1 | 6 | 1 | — | — | — | — | — | — |
| 4 | 1 | 2 | 6 | 1 | — | — | — | — | — | — |
| 2 | 1 | 1 | 6 | 1 | 4 | 1 | — | — | — | — |
| 2 | 1 | 2 | 6 | 1 | 4 | 1 | — | — | — | — |
| 2 | 2 | 3 | 6 | 1 | 4 | 2 | — | — | — | — |
| 0 | 1 | 1 | 6 | 1 | 4 | 1 | 2 | 1 | — | — |
| 0 | 2 | 2 | 6 | 1 | 4 | 1 | 2 | 1 | 2 | 2 |
| 0 | 3 | 3 | 6 | 1 | 4 | 2 | 2 | 2 | 2 | 3 |
| 0 | 3 | 4 | 6 | 1 | 4 | 2 | 2 | 2 | 2 | 3 |

STRUCTURE OF ROUTE SEARCH DATA

STRUCTURE OF RECOMMENDED ROUTE DATA

NODE INFORMATION AND LINK INFORMATION
IN RECOMMENDED ROUTE DATA

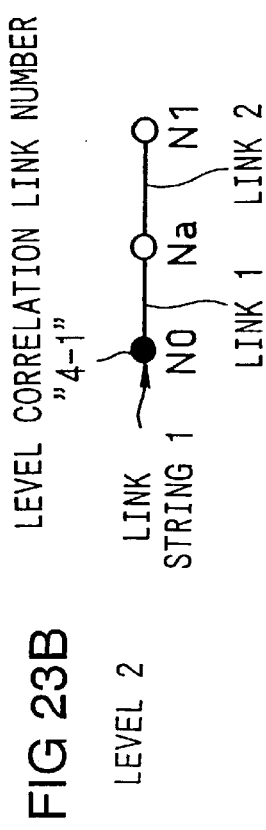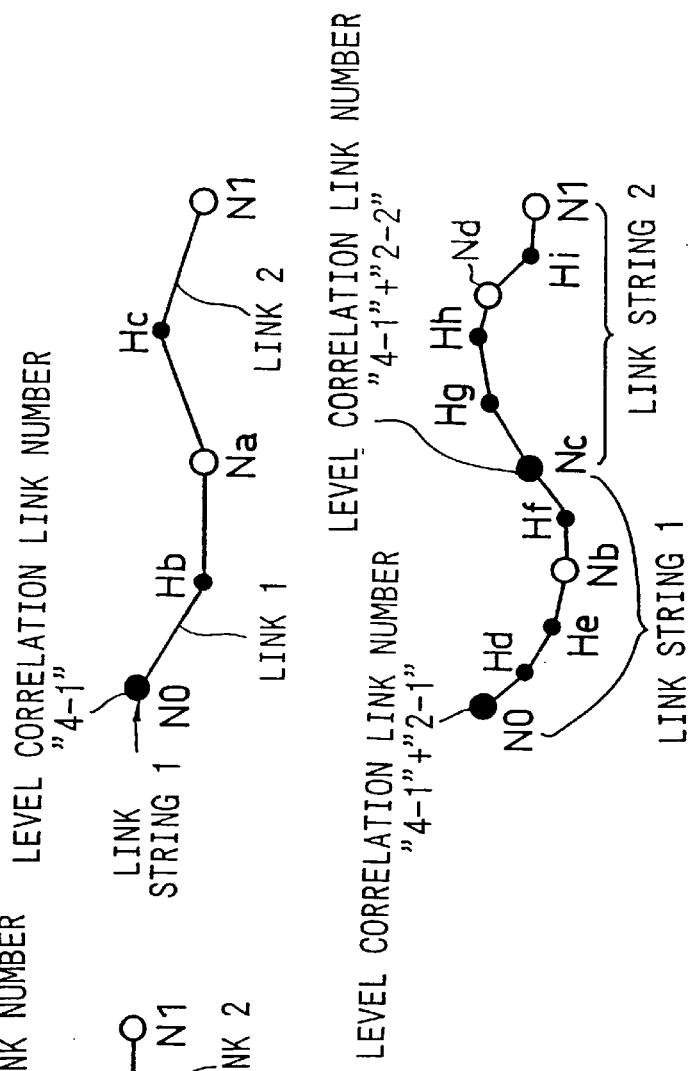
FIG. 23A  LEVEL 4
FIG. 23B  LEVEL 2
FIG. 23C  LEVEL 1

MAP DATABASE APPARATUS

INCORPORATION BY REFERENCE

The disclosures of the following priority applications are herein incorporated by reference:

Japanese Patent Application No. 8-279685 filed Oct. 22, 1996; and

Japanese Patent Application No. 9-9670 filed Jan. 22, 1997.

BACKGROUND OF THE INVENTION

1. Field of the Invention

The present invention relates to a map database apparatus which, preferably mounted in a navigation system for vehicles or the like, is used in roadmap display, map matching, calculation of a recommended route and the like.

2. Description of the Related Art

Vehicular navigation systems in the known art are provided with a function for displaying a roadmap of the area where the vehicle is currently located, a function for accurately detecting the vehicle position through map matching, a function for calculating a recommended route from a point of departure to a destination and the like. In these vehicular navigation systems in the prior art, roadmap display data, data for map matching and data for route search are separately stored in a CD ROM in order to maintain compatibility with existing software programs and also to improve the processing speed.

The roadmap display data include widest range map data for displaying large areas at the smallest scale, most detailed map data for displaying small areas in detail at the largest scale and a plurality of sets of map data at different scales between that of the widest range map data and that of the most detailed map data. For instance, the widest range map data may be referred to as level 4 data, the most detailed map data may be referred to as level 1 data and the sets of data at scales between those of the level 4 data and the level 1 data may be referred to as level 3 data and level 2 data. In that case, the route search data include two sets of data that correspond to the level 4 and level 2 roadmap data, and the vicinity of the point of departure and the vicinity of the destination are searched using the level 2 data and the other area is searched using the level 4 data for route search to reduce the length of time required for the route search.

FIG. 24 illustrates a roadmap depiction of roadmap display data which are stored in memory as level 4 data level 3 data. The level 4 roadmap display data and the level 3 roadmap display data are separately stored in CD ROM media. FIG. 24A shows a roadmap corresponding to one of the meshes in the level 4 data, i.e., a mesh M4, in which a road D1 and two roads D2 and D3 that connect at intersections C1 and C2 at the two ends of the road D1 are present. One of the small areas achieved by dividing one of the meshes of the level 4 data, i.e., the mesh M4 equally into sixteen portions, i.e., the hatched small area m3, constitutes a mesh of the level 3 data, i.e., a mesh M3 and, as shown in FIG. 24B, only a portion of the road D1, i.e., a road D4 is present in the mesh M3.

For instance, if the detail button is operated while the roadmap corresponding to the mesh M4 in the level 4 data is displayed on the monitor, the roadmap corresponding to the mesh M3 in the level 3 data will be displayed on the monitor. However, since there are no identification data to indicate that the road D1 and the road D4 are the same road, it is difficult to make a given road correspond through the different levels. In addition, a similar problem exists in regard to the route search data, and it is difficult to make the data searched at level 2 correspond to the data searched at level 4 in recommended route data that are the result of a route search. Moreover, since there are no identification data to indicate that a road in the roadmap display data and a road in the route search data are the same, it is difficult to achieve correspondence of a given road when the recommended route data are superimposed upon the roadmap display data.

SUMMARY OF THE INVENTION

An object of the present invention is to provide a map database apparatus which facilitates correspondence among data related to a given road at different levels and correspondence among different types of data that relate to the same road.

In order to attain this object, a map database apparatus according to the present invention stores a plurality of sets of link string data provided separately to correspond to maps at different scales representing a road as a link string constituted by connecting a plurality of links each having a node at a front end and a rear end thereof. In the map database apparatus, a level correlation link number is provided as data that indicate a link string in a lower order level at a larger scale that is common to a link in a higher order level at a smaller scale, the level correlation link number having a level number of the higher order level and a link number of the common link in the higher order level.

BRIEF DESCRIPTION OF THE DRAWINGS

FIG. 4 shows the structure of roadmap display data.

FIGS. 5A and 5B show a diagram illustrating the size of the link string in FIG. 4.

FIGS. 10A through 10D show different data lengths of node information and interpolation point information.

FIGS. 11A and 11B show an example of attribute 1+X coordinate data.

FIGS. 12A and 12B show an example of attribute 2+Y coordinate data.

FIGS. 13A and 13B show a diagram illustrating a level correlation link number.

FIG. 15 shows a diagram illustrating the level correlation link number in the case illustrated in FIG. 14.

FIGS. 23A through 23C show the procedure taken for drawing a recommended route in the image memory based upon the recommended route data in this embodiment.

DESCRIPTION OF THE PREFERRED EMBODIMENTS

Figure 1:
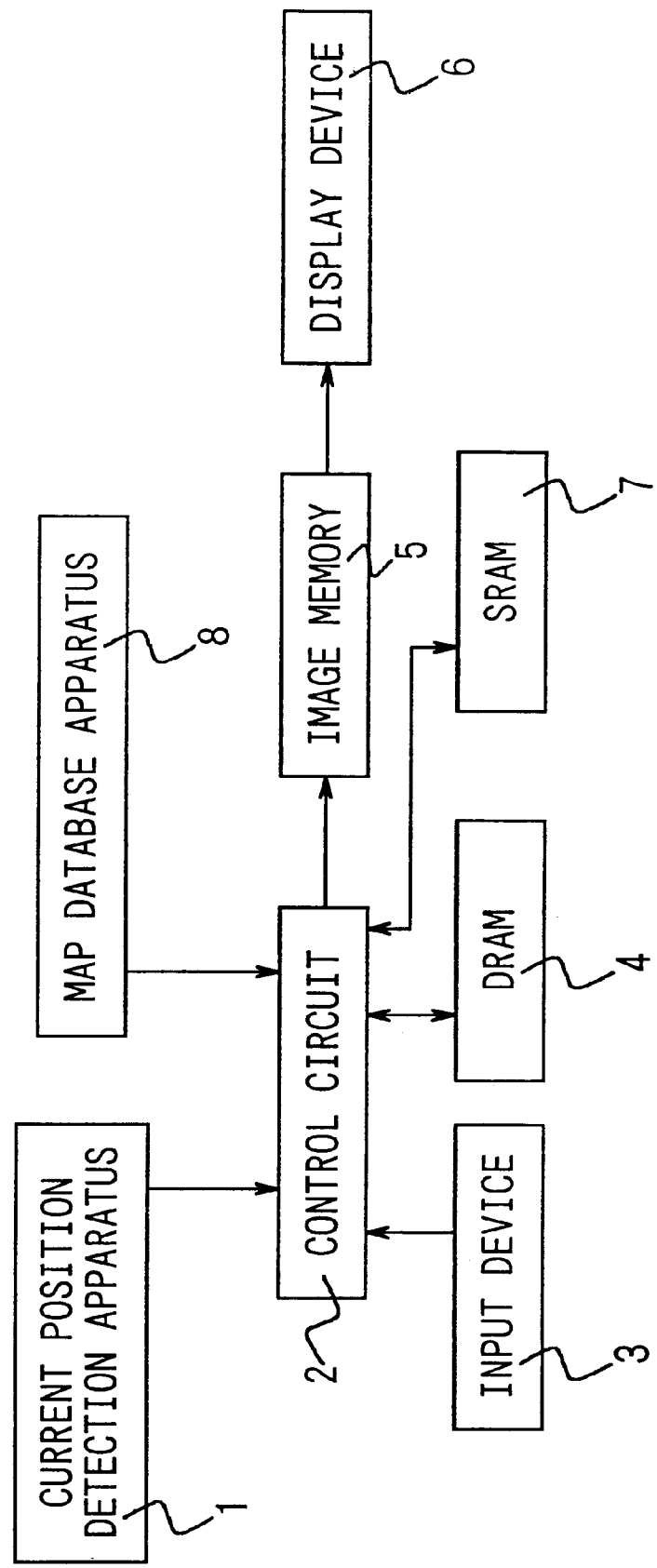
FIG. 1 shows a block diagram of an embodiment of a navigation system for vehicles installed with the map database apparatus according to the present invention.

FIG. 1 is a block diagram of an embodiment of a navigation system for vehicles that is internally provided with a map database apparatus according to the present invention. In FIG. 1, reference number 1 indicates a current position detection apparatus that detects the current position of a vehicle, which is constituted with, for instance, an azimuth sensor that detects the bearing of the vehicle while traveling, a vehicle speed sensor that detects the speed of the vehicle, a GPS sensor that detects a GPS signal from a GPS (Global Positioning System) satellite and the like.

Reference number 2 indicates a control circuit that controls the entire system and is constituted with a microprocessor and peripheral circuits. Reference number 3 indicates an input device for inputting destinations and the like for vehicles, reference number 4 indicates a DRAM that stores vehicle position information and the like detected by the current position detection apparatus 1, reference number 5 is an image memory that stores image data for display on a display device 6 and image data stored in the image memory 5 are read out as necessary to be displayed on the display device 6. Reference number 7 indicates an SRAM that stores node information, link information and the like on the recommended route calculated by the control circuit 2.

Reference number 8 indicates a map database apparatus that stores various types of data for performing roadmap display, route search, map matching and the like, which is constituted with, for instance, a CD ROM device, a magnetic recording device and the like. In the map database apparatus 8, map display data that constitute information related to road physical forms, road classifications and the like, and route search data that constitute branching point information, intersection information and the like that are not directly related to road physical forms, are stored. The map display data are mainly used when displaying a roadmap on the display device 6 and the route search data are mainly used when calculating a recommended route.

Next, the data structures of the map display data and the route search data stored in the map database apparatus 8 are described.

[1] Map Display Data (1) Overview of Link String Data

Figure 2:
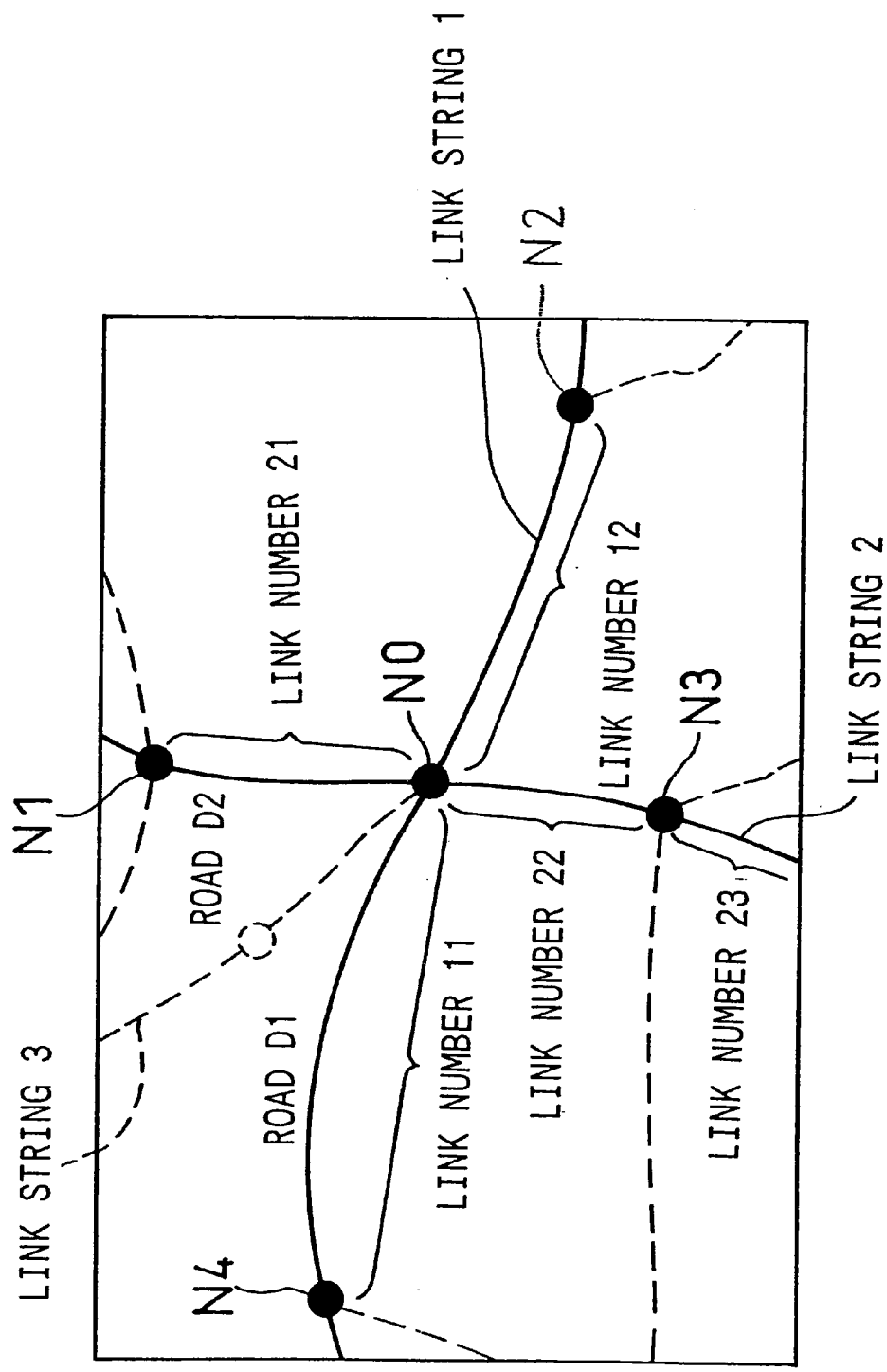
FIG. 2 shows an example of two roads intersecting within a mesh range.

Data management of the map display data in this embodiment is performed for each mesh range representing one of the partitioned areas achieved by dividing a roadmap into specific ranges, and individual roads present in a mesh range constitute separate link strings. For instance, as shown in FIG. 2, when two roads D1 and D2 intersect in one mesh range, the two roads constitute separate link strings 1 and 2, with the link string 1 comprising links 11 and 12 and the link string 2 comprising links 21–23. In this example, the links in the link string 1 and the links in the link string 2 represents roads of the same type. A link is the minimum unit that can represent a road and, in FIG. 2, the segment between the intersections constitutes one link unit, with inherent numbers assigned to the individual links (hereafter referred to as link numbers) for identification. The intersections in FIG. 2, i.e., the connection points of the individual links are expressed as nodes N0 N4. Nodes also constitute the start points and the end points of the individual links and, as detailed later, interpolation points that further divide the segments between nodes may sometimes be provided as well.

Figure 3:
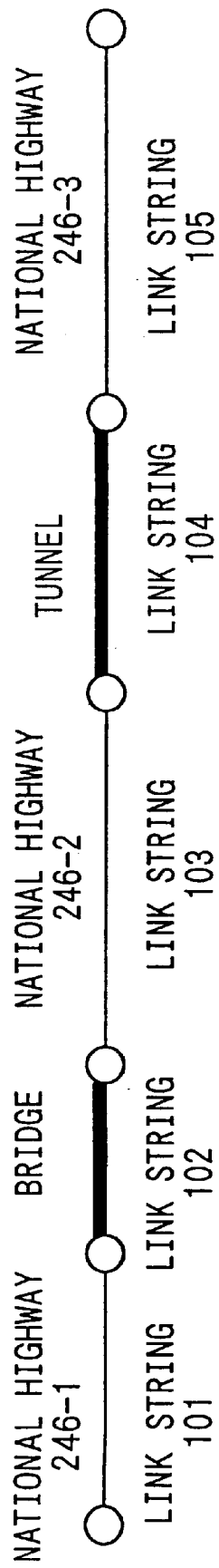
FIG. 3 shows a diagram illustrating link string data.

Also, in this embodiment, when there is a distinct structure such as a bridge, a tunnel or the like, on a road, the portions of the road preceding and following the structure constitute separate link strings. For instance, when there is a bridge and a tunnel on National Highway 246, as shown in FIG. 3, the portions preceding the bridge and the tunnel, the blocks corresponding to the bridge and the tunnel and the portions following the bridge and the tunnel all constitute separate link strings. In FIG. 3, these strings are designated as link strings 101–105. By making the portions preceding and following a distinctive structure on a road separate link strings, search of bridges, tunnels and the like on a roadmap is facilitated.

The map display data comprise a plurality of sets of data at different scales. In the explanation of this embodiment, the data at each scale are referred to as level n (n may be 14, for instance) data. Level 1 corresponds to the most detailed roadmap and as the level goes up, a roadmap over a wider range is presented at a smaller scale. Furthermore, as detailed later, in this embodiment, common link strings at different levels are managed with common level correlation link number to facilitate making data correspond among different levels.

(2) Data Structure of Link String Data

To give an explanation of the roads in FIG. 2, the map display data are structured by providing sets of link string data, each including various types of information related to the link string 1 or 2-*n*, for individual link strings, as shown in FIG. 4, and the data corresponding to each link string include link string information and node link information, with the link string information comprising the following types of data, as shown in FIG. 4.

1 link string size
2 number of element points
3 link attribute
4 road name offset
5 road number
6 level correlation link number In addition, the node link information comprises the following types of data, as shown in FIG. 4.

Figure 5A:
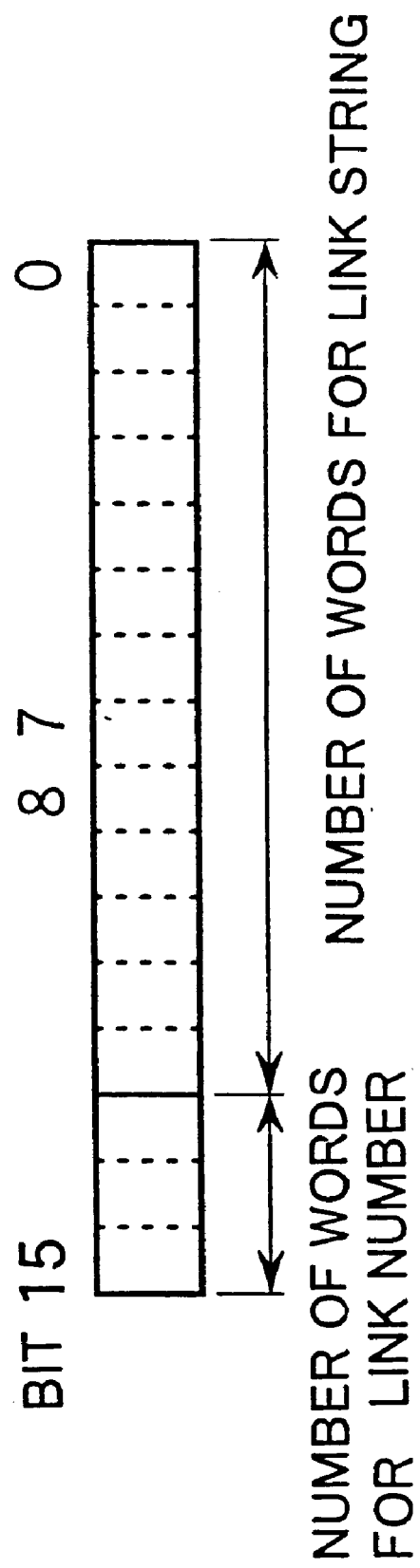
Figure 8:
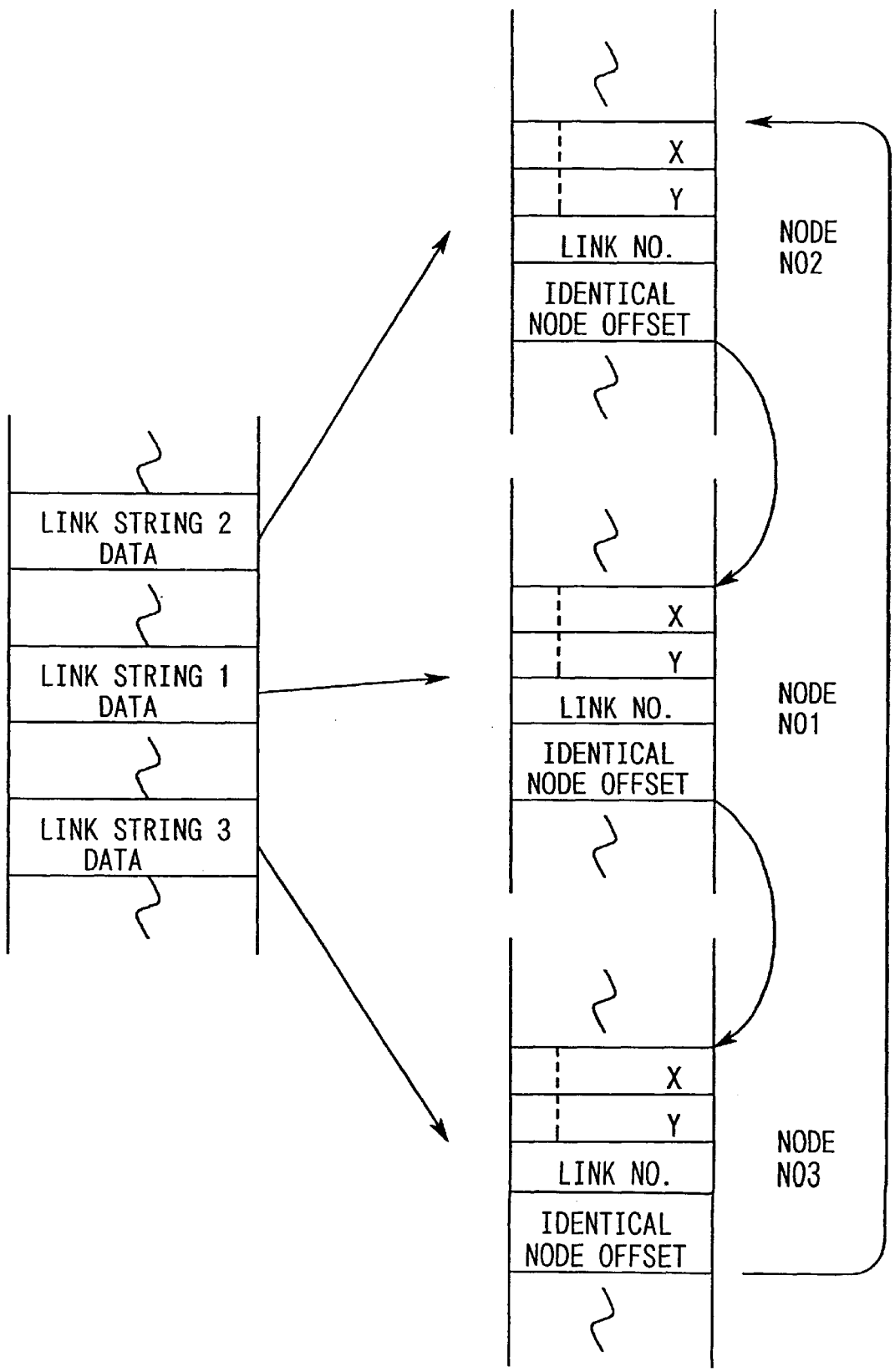
FIG. 8 shows a diagram illustrating the identical node offset information added to link string data.

1 attribute 1+X coordinate
2 attribute 2+Y coordinate
3 identical node offset
4 guide offset 5 link number
6 altitude information (3) Link String Information FIG. 5 shows a specific data structure of the data indicating a link string size and, as shown in FIG. 5A, the number of words that represents the storage size for the level correlation link number is stored in the 15th–13th bits. The level correlation link number is to be detailed later. As shown in FIG. 5B, 8 different values are assigned for word numbers so that "0,0,0" is indicated when there is no correlation link number and "1,1,1" is indicated when the correlation link number is represented by the equivalent of 7 words. The number of words that represents the storage size for the link string is stored in the 12th–0th bits. The link string storage size is stored in memory to achieve prompt access to the next link string data.

In FIG. 4, the number of element points data indicate the total number of node points and interpolation points, the link attribute data indicate the type of road, such as a national highway, a prefectural road, an expressway or the like and the road number is the actual designation number assigned to a national highway or prefectural road. The explanation of the road name offset is omitted since it is not relevant to this embodiment. The interpolation points are to be explained later.

(4) Node Link Information

Figure 6:
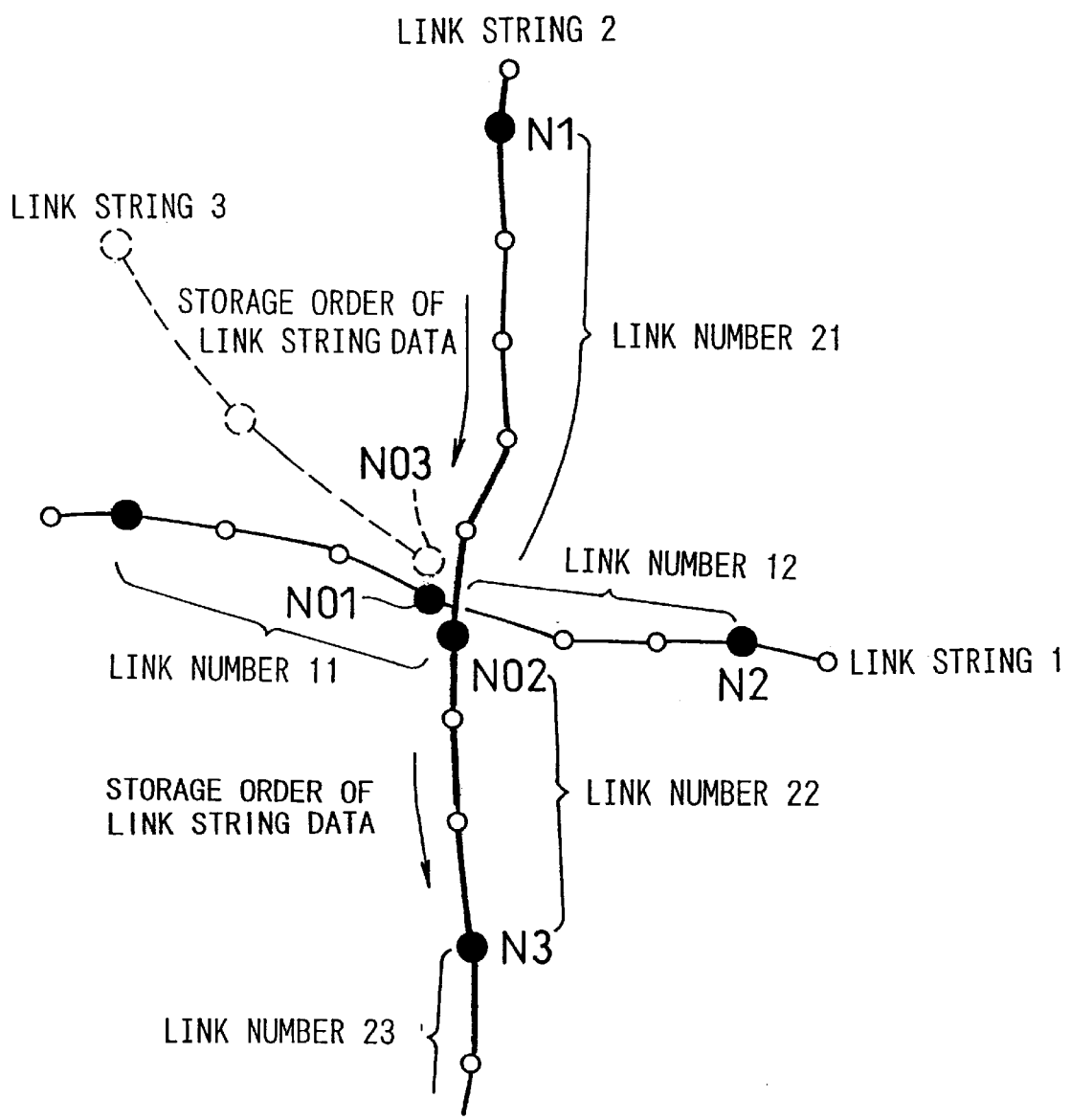
FIG. 6 shows an example of a roadmap with a plurality of nodes and a plurality of interpolation points.
Figure 7:
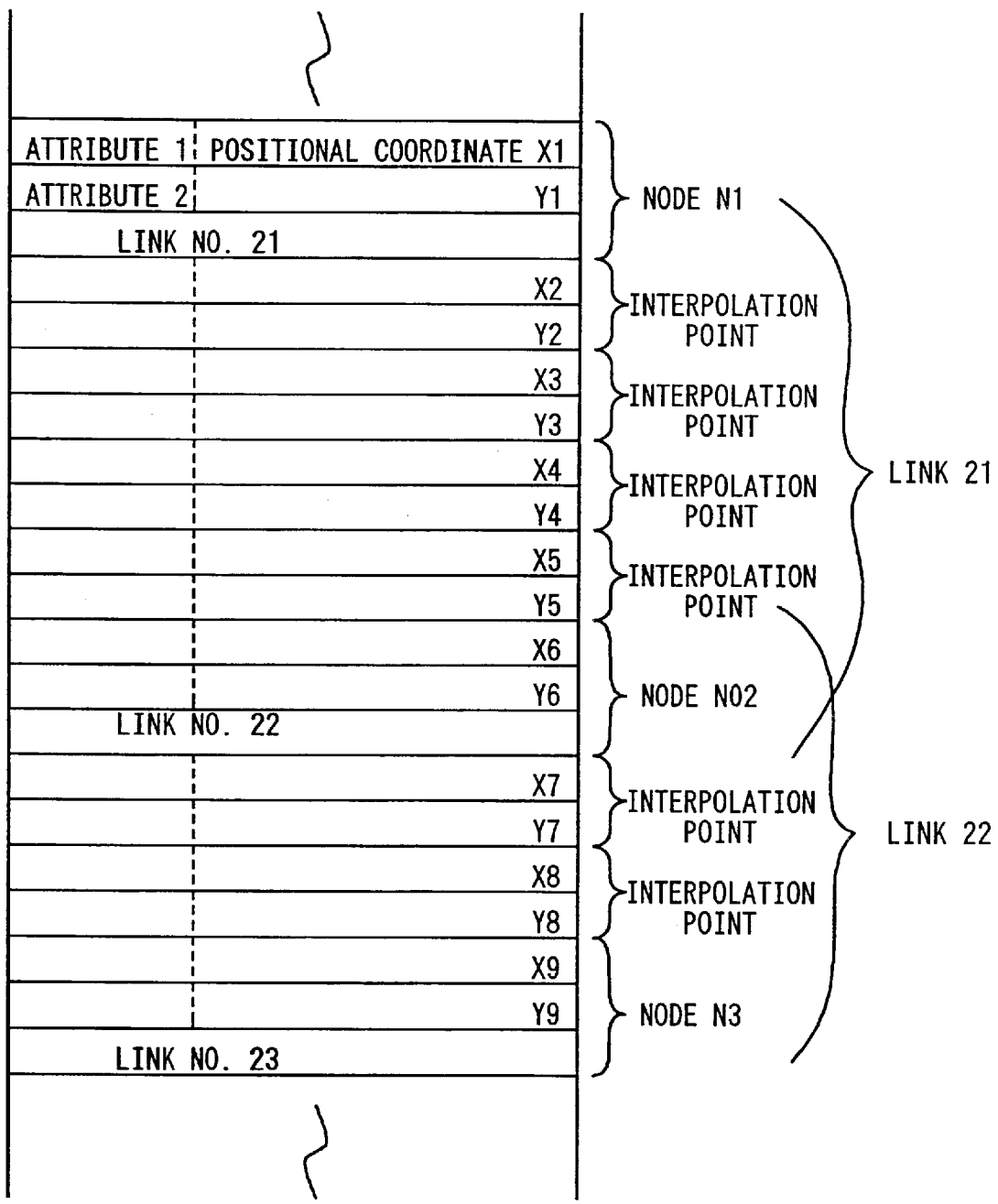
FIG. 7 shows a diagram illustrating the link string data corresponding to the road indicated with the bold line in FIG. 6.

FIG. 6 shows the link strings 1 and 2 in FIG. 2 in more detail. For instance, the node link information of the link string 2 indicated with the bold line in FIG. 6 is as shown in FIG. 7. As shown in the Figure, the data on the link string 2 include node information related to nodes N1, N02 and N3 (filled circles in FIG. 6) on the link string and interpolation point information related to the interpolation points (outline circles in FIG. 6). The node information includes positional X and Y coordinates of the node, the attribute and the link numbers of links connected to the node, whereas the interpolation point information includes the positional X and Y coordinates of the interpolation point. These positional coordinates are used as physical form data for recommended route display or physical form data for map matching, to be detailed later. The link string 2 indicated with the bold line in FIG. 6 includes a link assigned with a link number 21 located between the nodes N1 and N02, a link assigned with a link number 22 located between the nodes N02 and N3 and a link assigned with a link number 23 connected to the node N3. As is obvious from FIG. 7, the node information on the node N02 is shared by the link with link number 21 and the link with link number 22. The node information and the interpolation point information are positioned in the data structure in the order in which the links are connected. Thus, by sequentially reading out the link string data starting with the front end address, the road physical form, the road type and the like of the overall link string can be detected.

Figure 25:
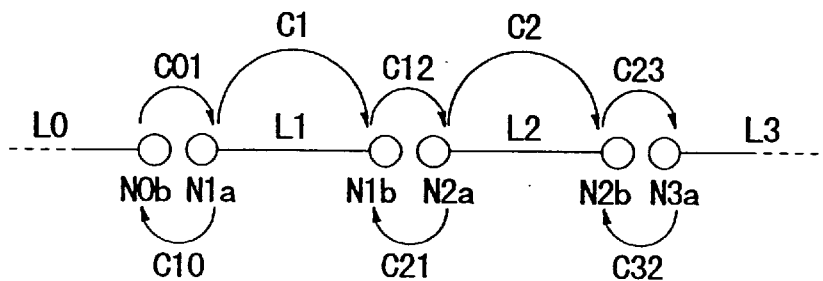
FIG. 25 shows an example of link data and node data in the prior art.

As has been explained, since, in this embodiment, data are managed in units of link strings within one mesh range and nodes between adjacent links are shared by the adjacent links, the entire volume of the data can be reduced compared to the case in which the data are managed in units of links, as in the example of the prior art shown in FIG. 25. In FIG. 25, links L0–L3 have nodes N0b, N1a, N1b . . . N3a at their start points and end points and sets of identical node information C01, C10 . . . for indicating identical nodes are provided as connection information for the individual nodes.

(5) Offset Indicating an Identical Node

In FIG. 6, of the nodes at the intersection of the link string 1 and the link string 2, the node in the link string 1 is assigned with a reference number N01, the node in the link string 2 is assigned with a reference number N02 and the node in the link string 3 is assigned with a reference number N03. In the data structure, the sets of node information corresponding to the intersecting points N01 N03 each has a data item referred to as an identical node offset.

The identical node offset is explained in detail in reference to FIG. 8. For instance, the address value indicating a storage area for the node information of the node N01 in the link string 1 is stored in memory as the identical node offset of the node N02 in the link string 2. Likewise, the address value indicating the storage area for the node information of the link string 3 is stored in memory as the identical node offset of the node N01 of the link string 1 and the address value of the address at which the node information of the node N02 in the link string 2 is stored in memory as the identical node offset of the node N03 in the link string 3.

Since nodes other than those at intersection, which are indicated as the intersecting points N01–N03 in FIG. 6, do not intersect other roads, a specific value, i.e., FFFFh, for instance, that indicates that no other node exists to constitute an identical node, is stored in the identical node offset storage areas of the node information for these nodes.

Figure 26:
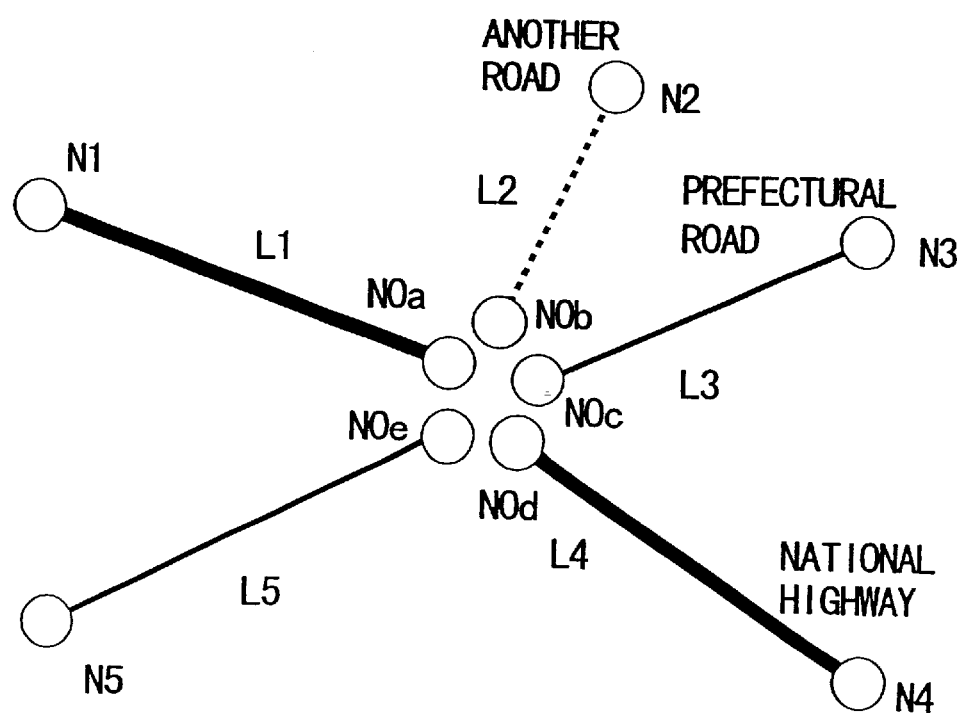
FIG. 26 shows a diagram illustrating an example of the prior art in which the separate segments of a road are assigned to separate links across an intersection.

By providing the identical node offset in this manner, even when there are a plurality of sets of node information in regard to identical nodes, as in the case of an intersection, the corresponding relationships among the individual sets of node information can be easily ascertained. Also, in contrast to an apparatus in the prior art shown in FIG. 26, which requires 5 nodes (N0a–N0d) corresponding to the intersection where three roads intersect, only three nodes (N01–N03) are required in this embodiment, as shown in FIG. 6, achieving a reduction in the data volume.

(6) Attribute 1

The attribute 1, which is stored together with the X coordinate of a node is constituted of offset information for reading out the link string data in the reverse direction. As explained earlier, in the link string data, the node information and the interpolation point information and the like are positioned in the order in which the actual connections are made. Because of this, by reading out the link string data sequentially from the front end address in the storage area, the road physical form can be accurately ascertained starting at the front end position.

Figure 9:
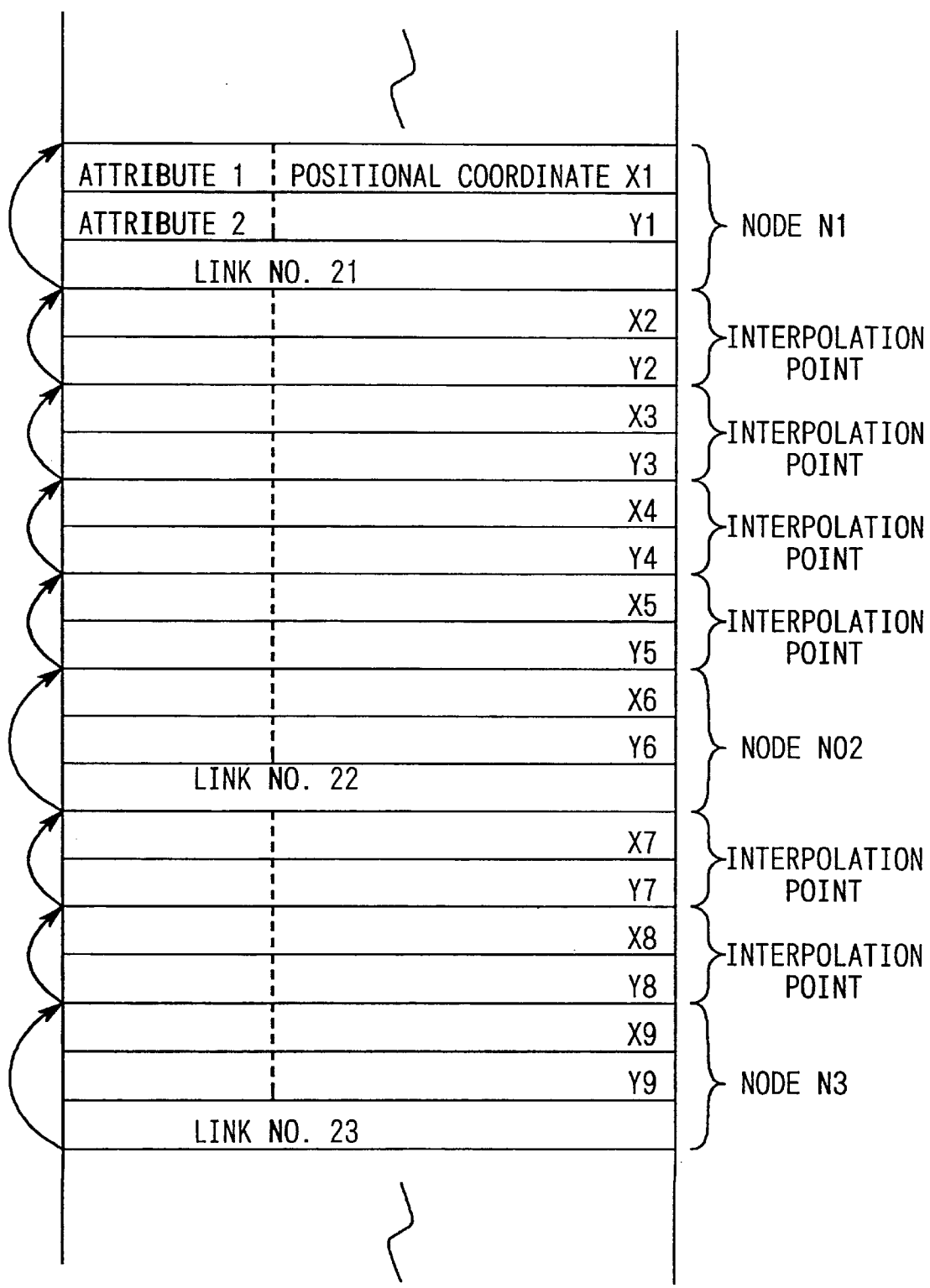
FIG. 9 shows a method for reading out the link string data from the rear end.

There are also situations in which it is necessary to ascertain the road physical forms from the end by reading out the link string data from the end. In such a case, after reading out the node information or the interpolation point information at the rear end, the header position of the node information or the like that is set immediately before in data arrangement must be detected. For instance, when reading out the link string data (FIG. 7) of the link indicated with the bold line in FIG. 6 from the end, it is necessary to first read out the node information on the node N3 and then to detect the header position of the interpolation point information that is set immediately before in the data arrangement to read out the interpolation point information from this header position, as indicated with the arrows in FIG. 9. However, as explained below, the data volume of the node information and the interpolation point information varies among various nodes and interpolation points, and the header positions of node information and interpolation point information cannot be determined uniformly.

FIGS. 10A–10D shows varying data volumes of node information and interpolation point information, with FIG. 10A representing a case in which node information or the like is constituted with two words, i.e., the X and Y positional coordinates, FIG. 10B representing a case in which node information or the like is constituted with three words by adding identical node offset to the two words in FIG. 10A, FIG. 10C representing a case in which node information or the like is constituted of four words by adding guide offset information to the three words in FIG. 10B and FIG. 10D representing a case in which node information or the like is constituted of five words by adding a link no. to the four words in FIG. 10C.

As shown in FIGS. 10A–10D, since the data volume of node information or interpolation point information varies for each case, the information that indicates the header positions of the node information and the interpolation point information is added to the link string data in advance as attribute 1 data in this embodiment. In this embodiment, they are added together with the X positional coordinates of the individual nodes and interpolation points.

Figure 11A:
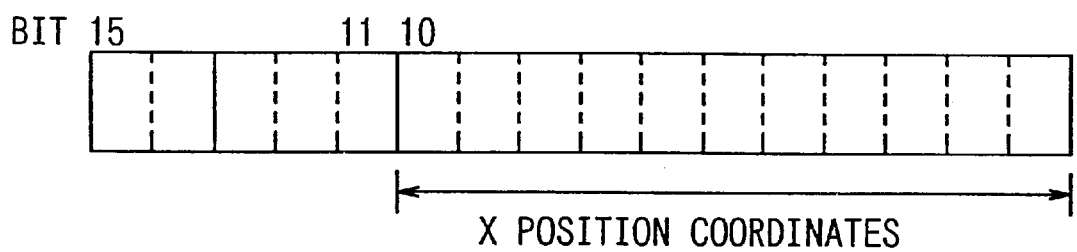

For instance, FIG. 11A shows an example in which the X positional coordinates are stored in the lower order 11 bits and information that indicates the header positions of various sets of node information and the like is stored in the higher order 2 bits, in the 2-byte data constituting the attribute 1+X coordinate data. The information that indicates the number of words that are present up to the header position of each set of node information or the like is stored in these higher order 2 bits.

Thus, since the information that indicates the header position of the immediately preceding set of node information or the like is added to the link string data in this embodiment, even when the link string data are read out in the reverse direction, the entire node information or the like can be read out without omissions.

(7) Attribute 2

Figure 12A:
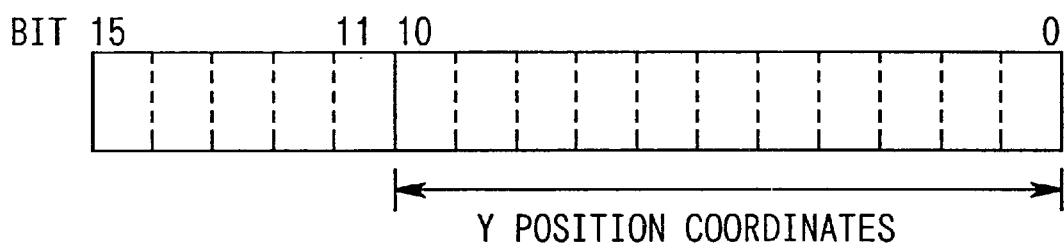

The attribute 2, which is stored together with the Y coordinate of a node, includes traffic regulation information, road width information and number of lanes information. The data length of each set of data of the node link information that constitutes the link string data is 16 bits (2 bytes=1 word). In the lower order 11 bits of the data indicating the attribute 2+Y coordinate, the Y positional coordinates are stored and in the higher order 5 bits, the traffic regulation information, the road width information and the number of lanes information are stored, as shown in FIG. 12A. One type of the information from 1–8 in FIG. 12B is selected through a specific bit combination for the higher order 5 bits.

Since the road width information, the traffic regulation information and the number of lanes information are stored by using the available bits in the 2 byte data for storing the positional coordinates or the like of a node, the road width information, the traffic regulation information and the like can be added to the link string data without having to increase the volume of data.

(8) Altitude Information

When displaying a roadmap in three dimensions, data concerning the altitude differences among a plurality of points on the roadmap are required. Accordingly, in this embodiment, all the altitude information on the various links constituting a link string is added at the end of the link string data. It is to be noted that since link string data including altitude information and link string data without altitude information are present together, each set of altitude information can be added to a plurality of nodes and a plurality of interpolation points.

By adding the altitude information to the link string data, a roadmap can be displayed in three dimensions. In addition, since all the altitude information is added together at the end of the link string data , the altitude information can be read out only when it is required and when the altitude information is not required, such as when displaying a regular flat map, for instance, only the data immediately preceding the altitude information need be read out.

(9) Level Correlation Link Number

Figure 13A:
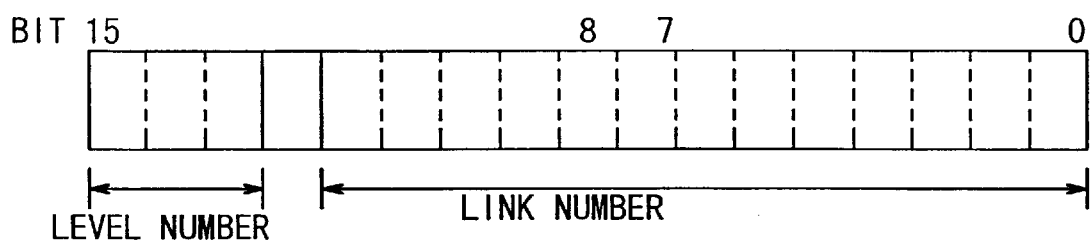

FIG. 13 illustrates the level correlation link number. A level correlation link number comprises the level number which is stored in the 15th–13th bits shown in FIG. 13A and the link number stored in the 11th–0th bits. The link number stored in the lower order 12 bits is a link number that is assigned to the level which corresponds to the level number stored in the higher order 3 bits. For instance, when the roadmap display data are set in four hierarchical levels, i.e., level 4–level 1 and the route search data are set in two hierarchical levels, i.e., level 4 and level 2; "0, 0, 1" which indicate level 4 is stored as the level number in the higher order 3 bits of the level correlation link number in the level 2 roadmap display data and the link number assigned to the level 4 data is stored in the lower order 11 bits.

Figure 14:
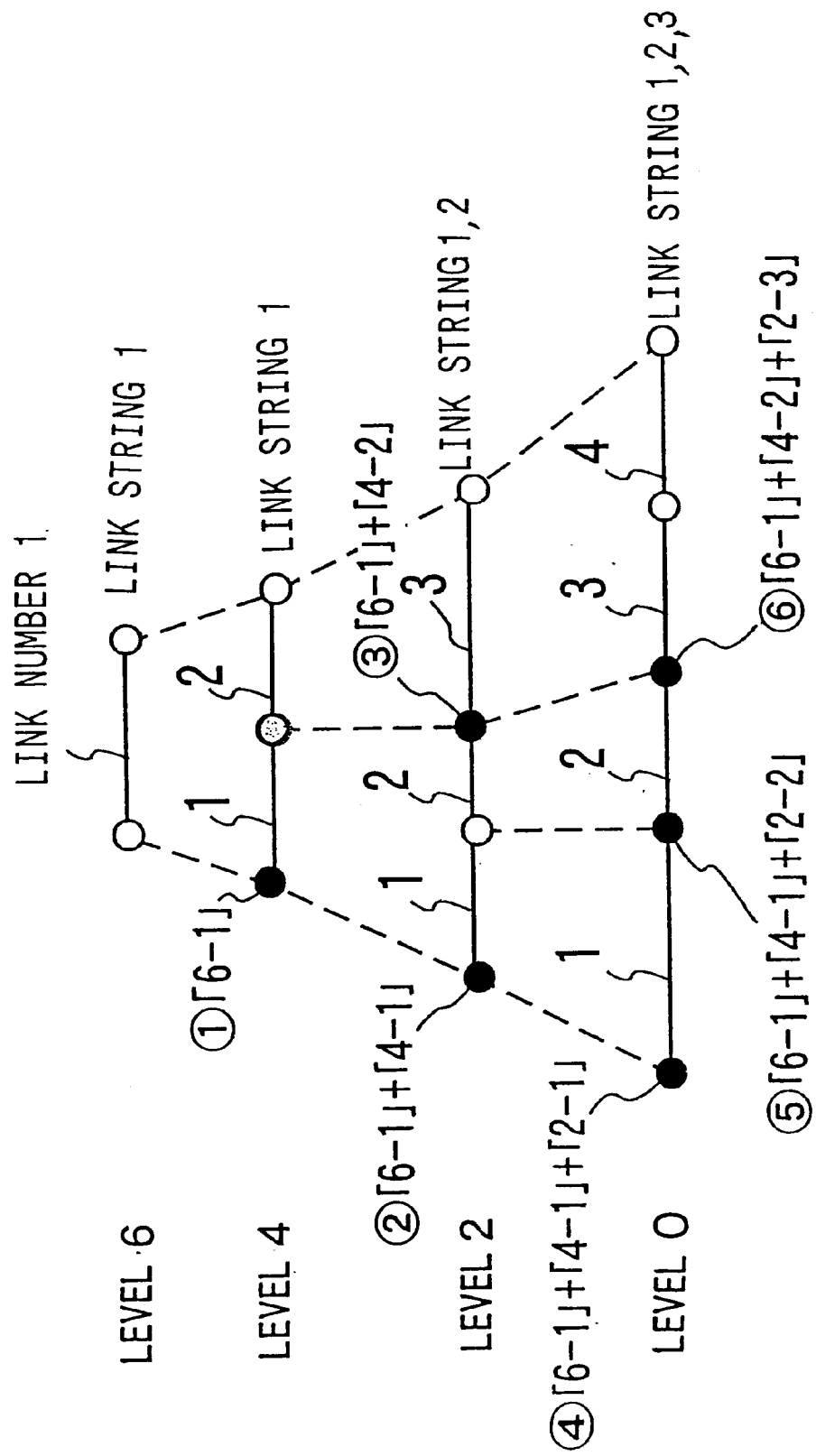
FIG. 14 shows common link strings at different levels and links constituting the link strings.

The level correlation link number are further explained in reference to FIG. 14. It is to be noted that, in order to facilitate understanding, the explanation is given on the level 6 data, the level 4 data, the level 2 data and the level 0 data among the data over the seven levels, i.e., levels 6–0. The link that corresponds to the link number 1 of the link string 1 at level 6 comprise two links that are assigned with link numbers 1 and 2 constituting the link string 1 at level 4. The link that corresponds to the link number 1 at level 4 comprise two links assigned with link numbers 1 and 2 constituting the link string 1 at level 2 and the link corresponding to the link number 2 at level 4 is constituted of the link assigned with the link number 3 constituting the link string 2 at level 2. The link corresponding to the link number 1 at level 2 is constituted of the link assigned with the link number 1 constituting the link string 1 at level 0, the link corresponding to the link number 2 at level 2 is constituted of the link assigned with the link number 2 constituting the link string 2 at level 0 and the link corresponding to the link number 3 at level 2 comprises two links assigned with the link numbers 3 and 4 constituting the link string 3 at level 0.

FIG. 15 illustrates the level correlation link number stored at the front end node (filled circle) in each of the link strings shown in FIG. 14. Numbers (1)–(6) in FIG. 15 are assigned in correspondence to the level correlation link numbers (1)–(6) which are stored at the front end nodes in the individual link strings in FIG. 14.

No level correlation link number is stored at level 6. The word length of the level correlation link number at level 4 is 1, i.e., "6-1". In this number, "6" indicates the level 6, which is higher order than the level 4 and "1" indicates the link number of the link at the higher order level 6 which corresponds to the link string 1 at level 4. The same principle applies to the following level correlation link number "4-1", "2-1" and the like.

The word length of the level correlation link number at level 2 is 2, i.e., "6-1"+"4-1" for the link string 1 and 2, i.e., "6-1"+"4-2", for the link string 2.

The word length of the level correlation link number at level 0 is 3, i.e., "6-1"+"4-1"+"2-1" for the link string 1, 3, i.e., "6-1"+"4-1"+"2-2" for the link string 2 and 3, i.e., "6-1"+"4-2"+"2-3" for the link string 3.

By using the level correlation link number, identical link strings at different levels can be made to correspond with one another and identical link strings in the map display data and in the route search data can be made to correspond with each other, with a high degree of ease, thereby achieving a reduction in processing time.

[2] Route Search Data

The route search data include a plurality of sets of data corresponding to a plurality of sets of roadmap display data for different scales, and the data for each scale are referred to as level m (m, may be, for instance, 2, 4) data. In addition, in this embodiment, common link strings at different levels are managed through common level correlation link number to facilitate correspondence of data at different levels and the correspondence with the roadmap display data.

Figure 16:
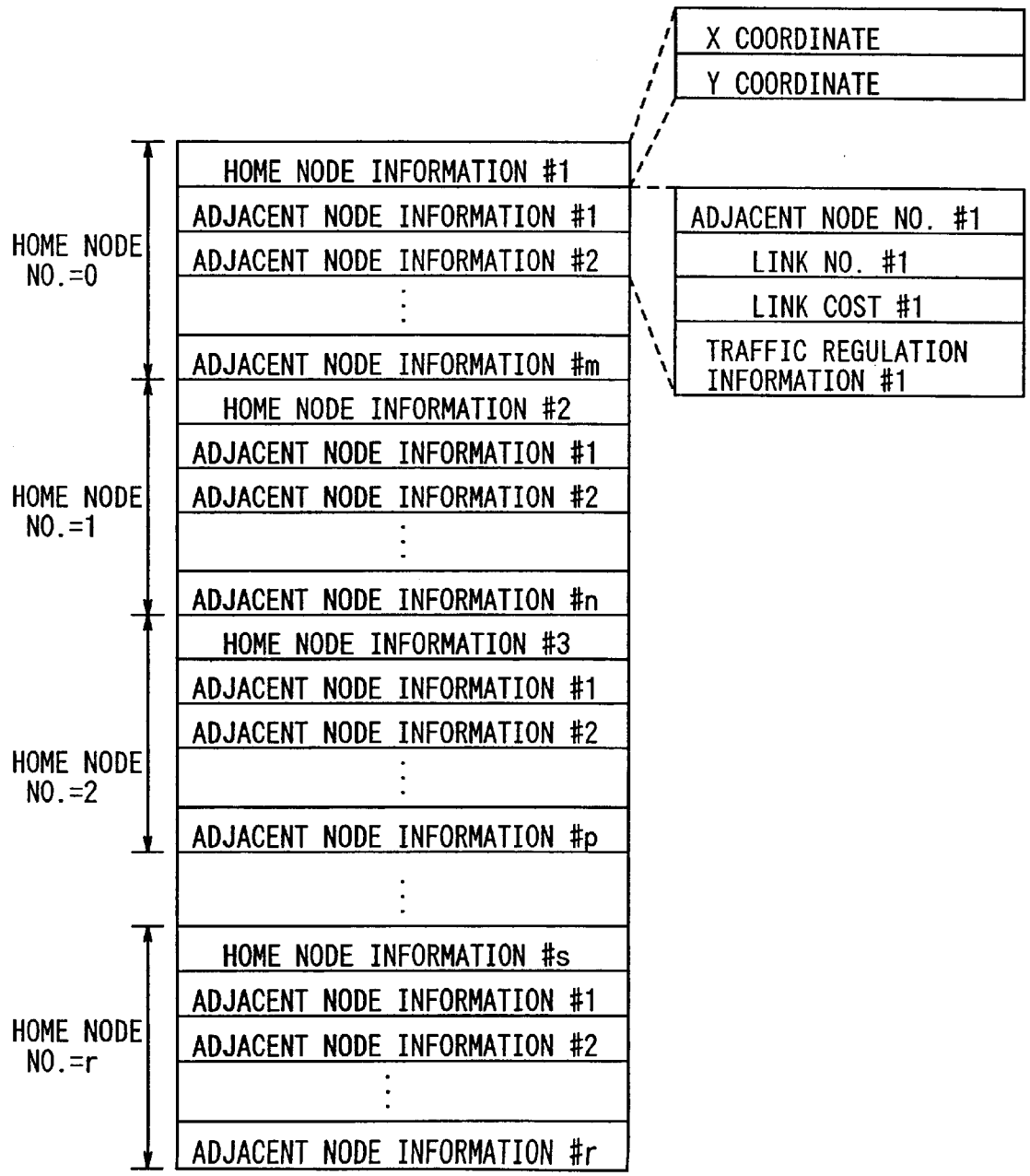
FIG. 16 shows the structure of route search data.

FIG. 16 shows the data structure of route search data. As shown in the Figure, in the route search data, node information that indicates the connecting relationship with other nodes is stored for each connecting point (node) of links, which are the minimum units for expressing a road physical form. Each set of node information is constituted with home node information and adjacent node information, with the node positional coordinates stored in the home node information. In the adjacent node information, as shown in the Figure, the adjacent node no., the link no. from the home node to the adjacent node, the link cost of the link and traffic regulation information on that link are stored. Also, various sets of node information are stored in the order of link connections and the node no. of the home node can be ascertained by the order in which it is stored. Because of this, even without storing the node nos. of the home nodes as home node information, the node nos. of the home nodes can be ascertained, achieving a reduction in memory requirement.

[3] Recommended Route Data

Figure 17:
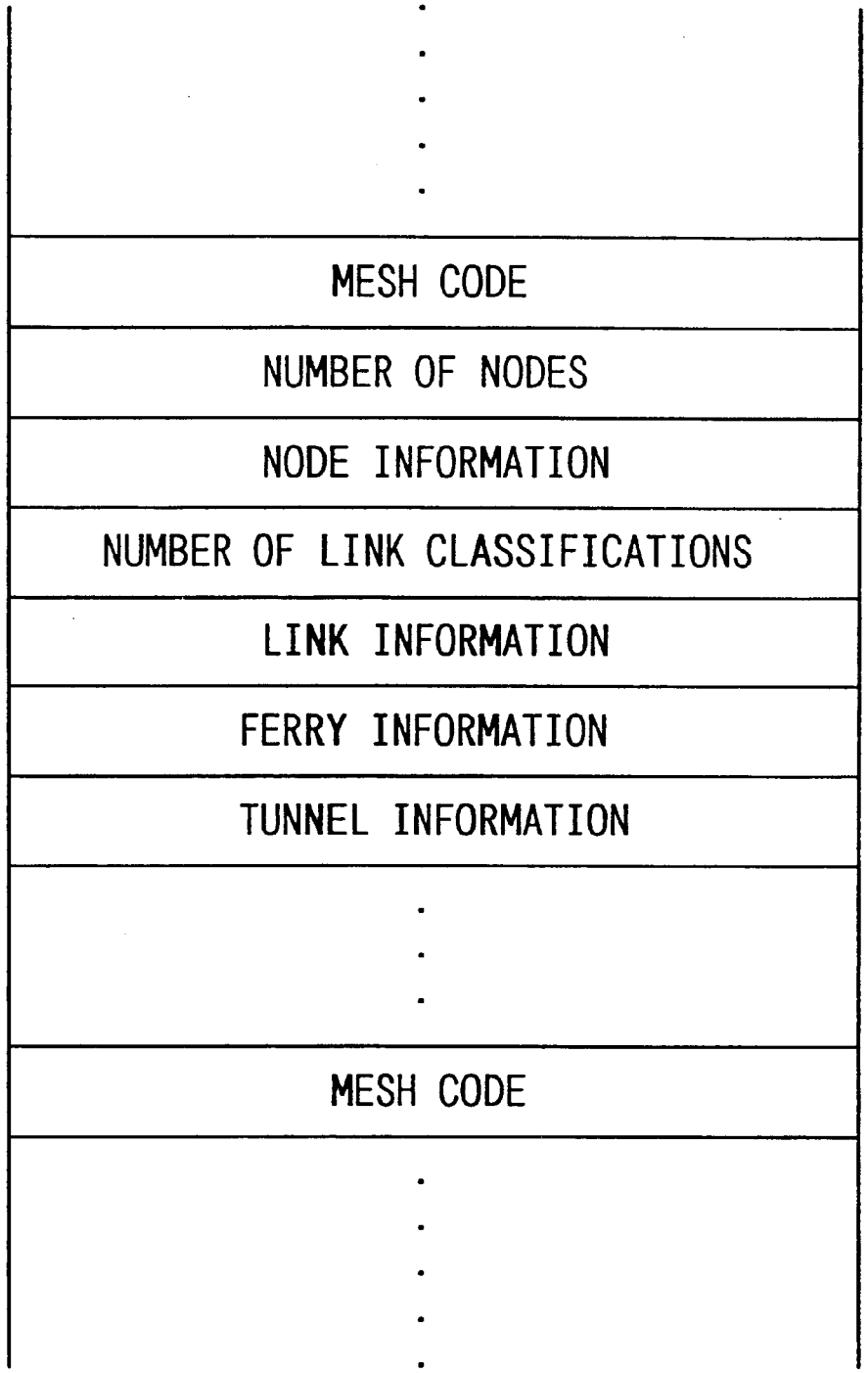
FIG. 17 shows an overview of the structure in the recommended route data.

FIG. 17 shows an outline of the data structure of recommended route data which represent a recommended route from a point of departure to a destination which has been searched based upon the route search data. In the recommended route data, node information and link information on the recommended route are stored, while classified in units of mesh ranges. It is to be noted that a mesh range refers to a partitioned range when a roadmap is partitioned into units of specific ranges.

Figure 18A:
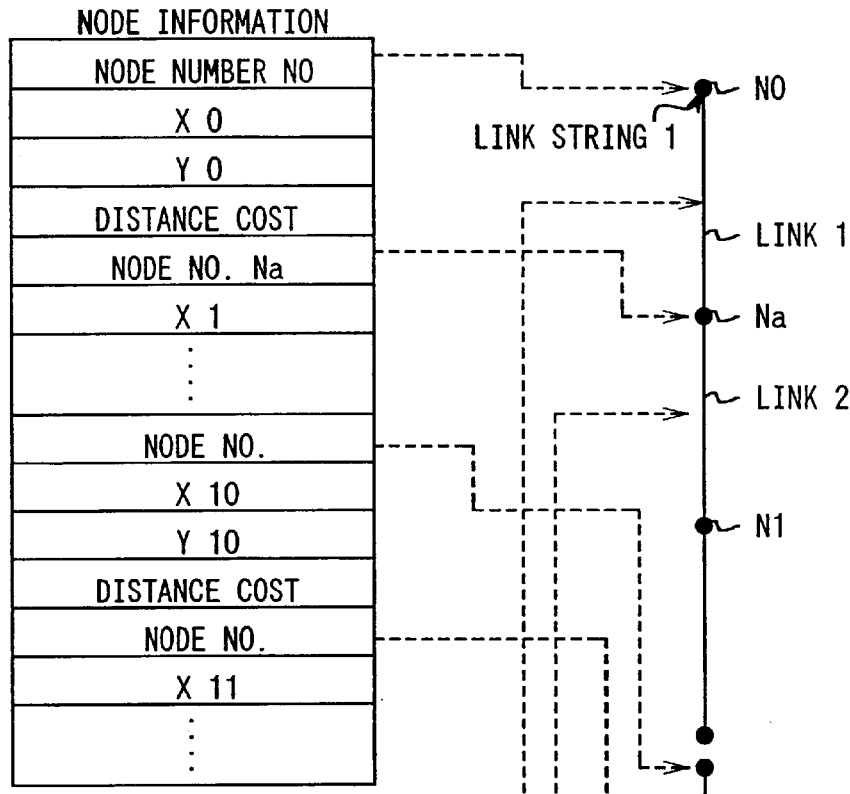
FIGS. 18A and 18B show a detailed diagram illustrating the data structure of the node information and the link information in the recommended route data.
Figure 18B:
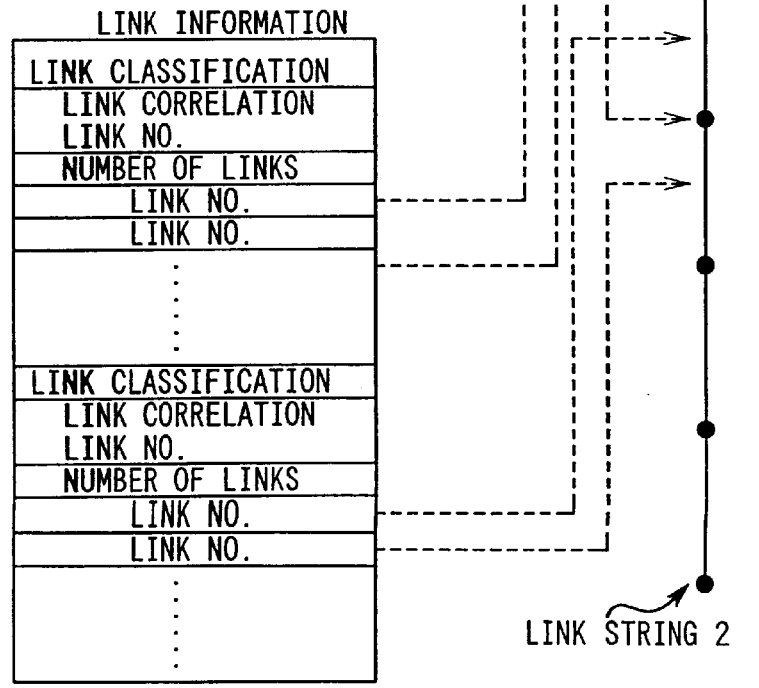

As shown in FIG. 17, the recommended route data are constituted with a mesh code, the number of nodes, node information, the number of link classifications, link information, ferry information and tunnel information. The number for identifying the mesh range is stored in the storage area for the mesh code, the number of nodes present within a mesh range is stored in the storage area for the number of nodes and, as shown in detail in FIG. 18A, the node no., the positional coordinates, the distance cost and the like of each node within a mesh range are stored in the storage area for the node information. In addition, the number of link classifications that are present inside a mesh range is stored in the storage area for the number of link classifications and, as shown in detail in FIG. 18B, the link classification, the level correlation link number, the number of links, the link no. and the like of each link within a mesh range are stored in the storage area for the link information. FIGS. 18A and 18B illustrate a case in which there are two link strings 1 and 2 within the area indicated by the same mesh code.

It is to be noted that, as explained above, recommended route data are prepared at different levels and, in this embodiment, recommended route data at level 2 are prepared for the vicinities of the start point and the end point on the recommended route while recommended route data at level 4 are prepared for the middle range between the start point and the end point.

The following is an explanation of the operation performed in this embodiment in reference to the flowchart, and in this embodiment, the recommended route is displayed on the display device 6 in the following manner. The recommended route is searched by using the route search data at level 4 and level 2 to create recommended route data at level 4 and level 2, and then, based upon the recommended route data at level 4 and level 2 and the roadmap display data at level 2 and level 1, the recommended route is drawn and superimposed upon the roadmap at level 2 or level 1, which is displayed on the display device 6, with the recommended route highlighted with a red bold line, for instance.

Figure 19:
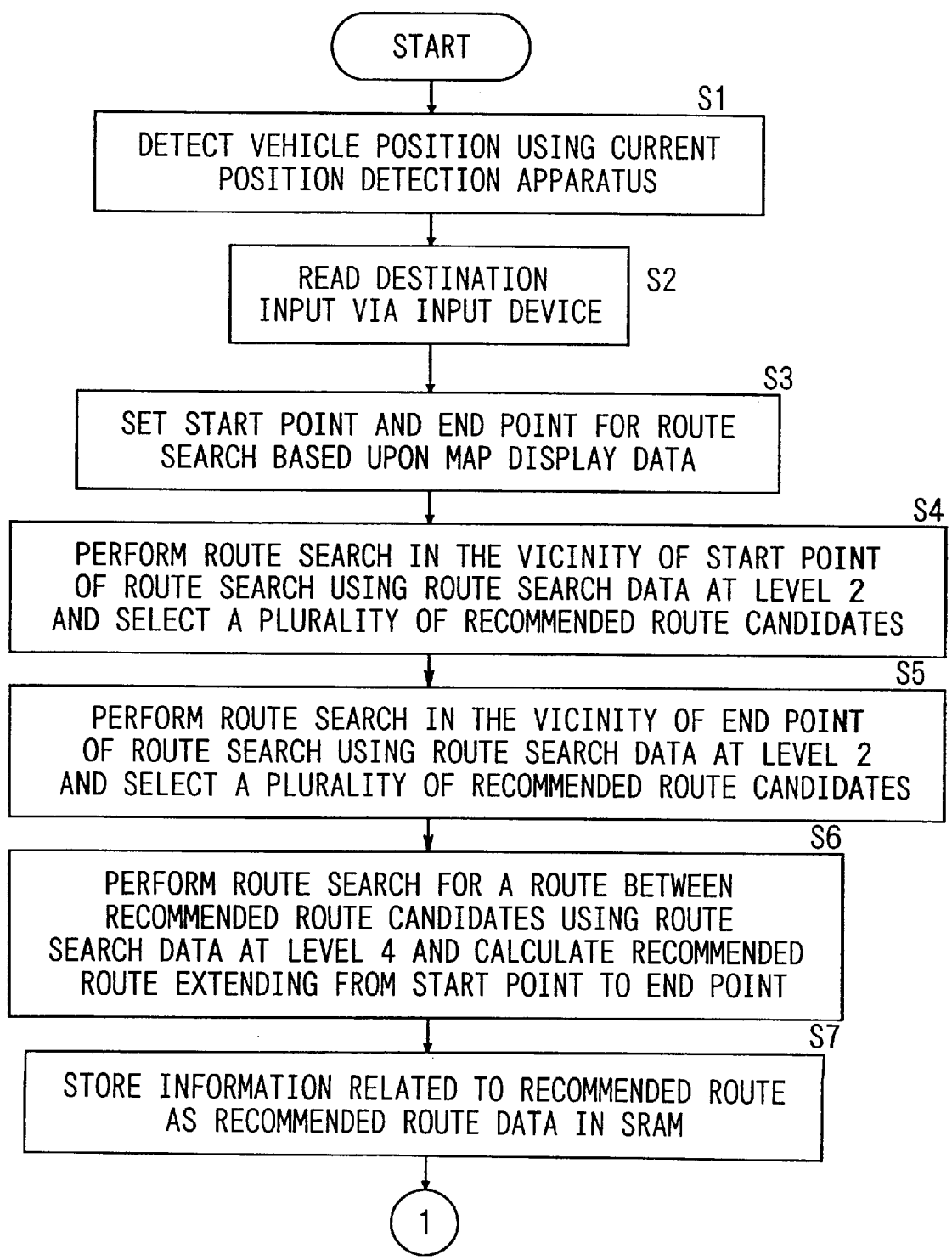
FIG. 19 shows a flowchart outlining the main processing performed by the control circuit.
Figure 20:
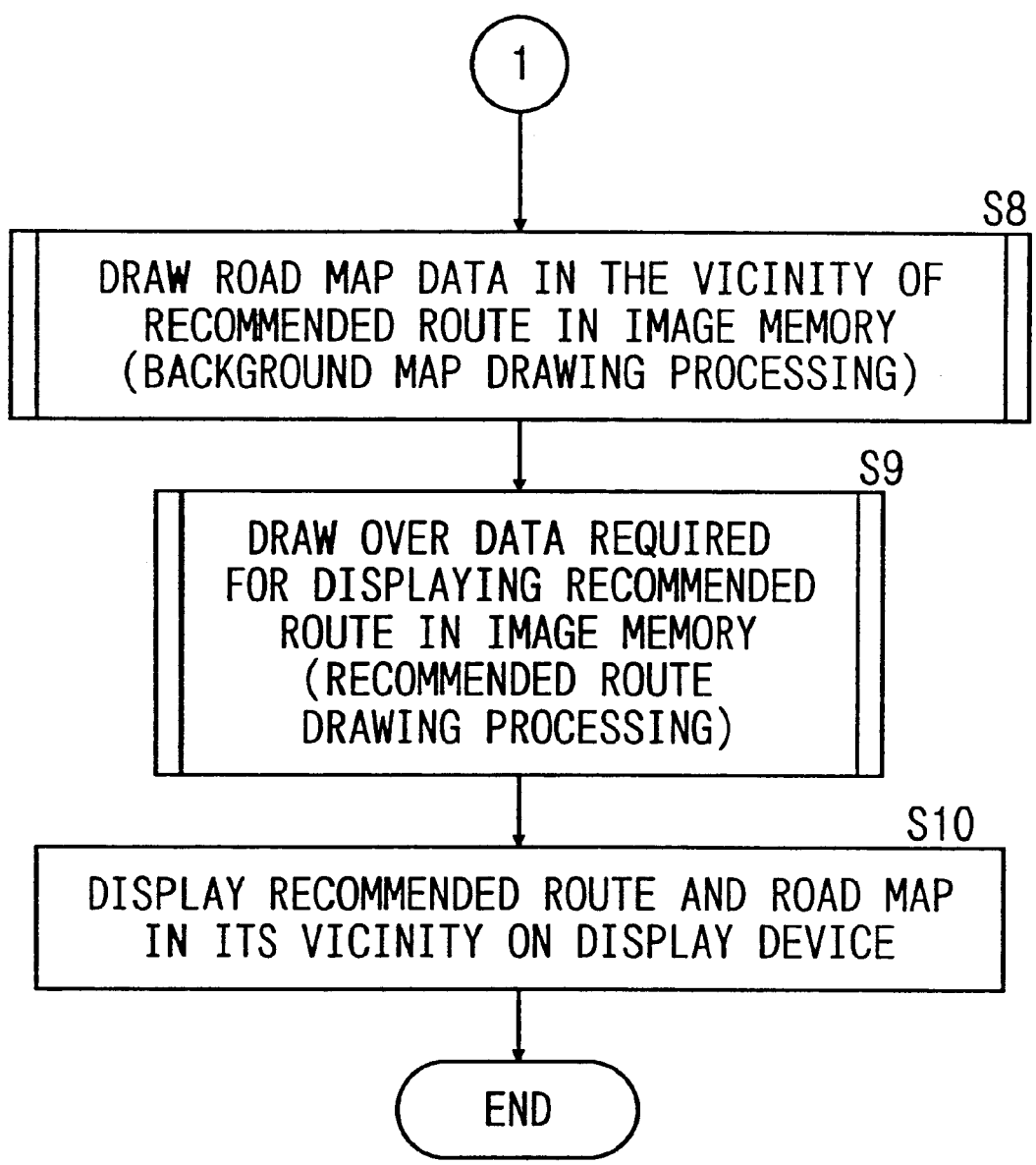
FIG. 20 shows the flowchart continuing from FIG. 19.

FIGS. 19 and 20 are a flow chart illustrating the outline of the main processing performed by the control circuit 2. In step S1 in FIG. 19, the vehicle position is detected by the current position detection apparatus 1. In step S2, the destination, which has been input via the input device 3, is read in. In step S3, based upon the map display data stored in the map database apparatus 8, the start point and the end point of the route search are set on roads for which route search is possible. For instance, the start point of a vehicle may be the current position of the vehicle (vehicle position) and the end point is the destination.

In step S4, using route search data at level 2, route search in the vicinity of the start point of the route search is performed, and a plurality of candidates for the recommended route in the vicinity of the start point are selected. In step S5, using route search data at level 2, route search in the vicinity of the end point of the route search is performed, and a plurality of candidates for the recommended route in the vicinity of the end point are selected.

In step S6, using route search data at level 4, route search is performed for routes between the candidates for the recommended routes selected in step S4 and step S5, and a recommended route from the start point to the end point is calculated.

Route search data at different levels are used for the vicinities of the start point and the end point, and the middle range between the start point and the end point in this manner because if route search is performed using route search data at level 2 for the entire route, the data quantity will be very large and, as a result, the calculation time required in route search will increase. In step S7, the information related to the recommended route calculated in step S6 is stored in the SRAM 7 as recommended route data.

Figure 21:
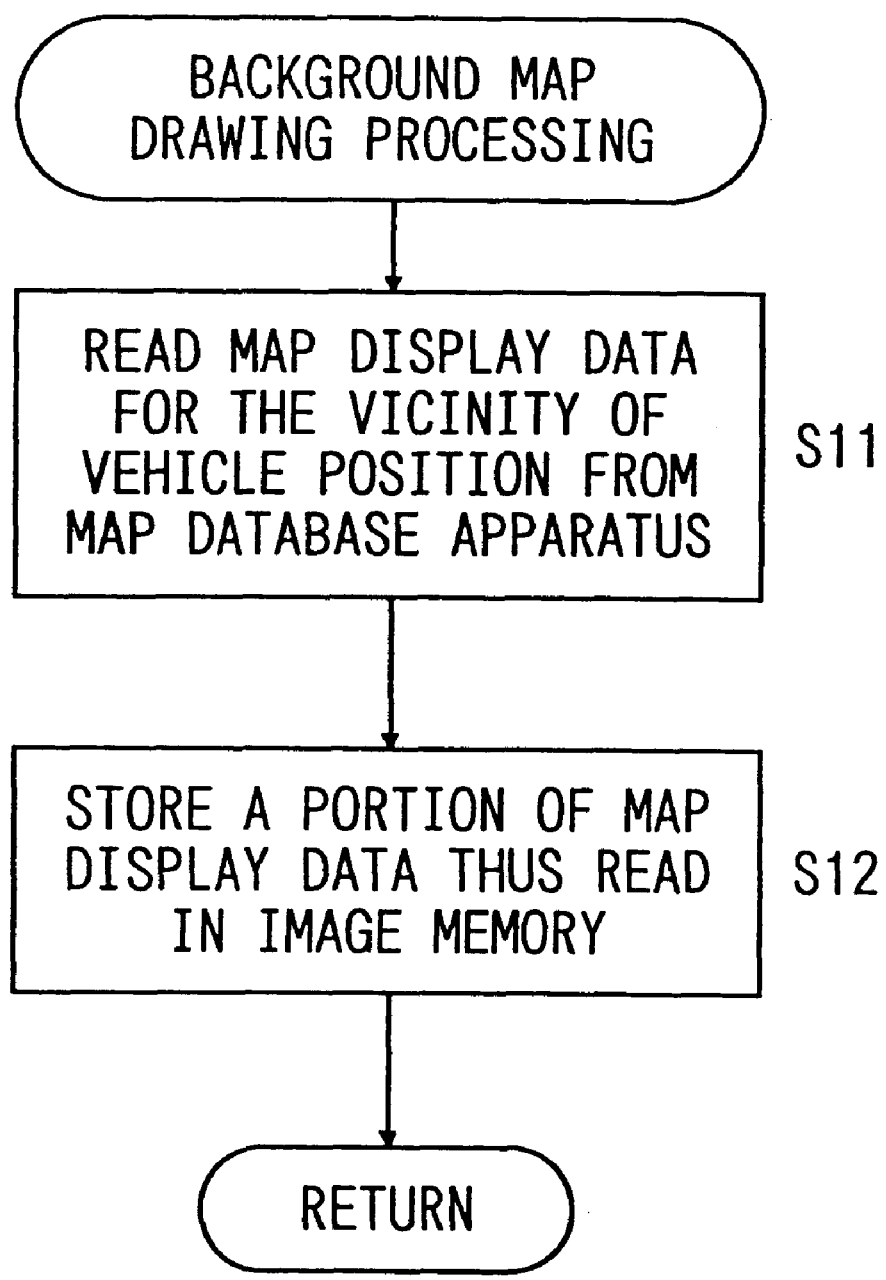
FIG. 21 shows a detailed flowchart illustrating the background map drawing processing performed in step S8 in FIG. 20.

When the processing performed in step S7 in FIG. 19 is completed, the operation proceeds to step S8 shown in FIG. 20, in which the background map drawing processing, the details of which are shown in FIG. 21, is performed to draw (store) data related to the roadmap in the vicinity of the recommended route in the image memory 5 for display on the display device 6. First, in step S11 in FIG. 21, map display data corresponding to the vicinity of the current vehicle position are read from the map database apparatus 8. Next, in step S12, a portion of the map display data thus read, is drawn (stored) in the image memory 5.

When the processing performed in step S12 in FIG. 21 is completed, the operation proceeds to step S9, shown in FIG. 20, in which the data required to display the recommended route calculated in step S3 are also drawn over (stored) in the image memory 5. The recommended route drawing processing performed in step S9 is described in more detail later. In step S10, the data stored in the image memory 5 are read out and the recommended route and the roadmap in the vicinity are displayed on the display device 6.

Figure 22:
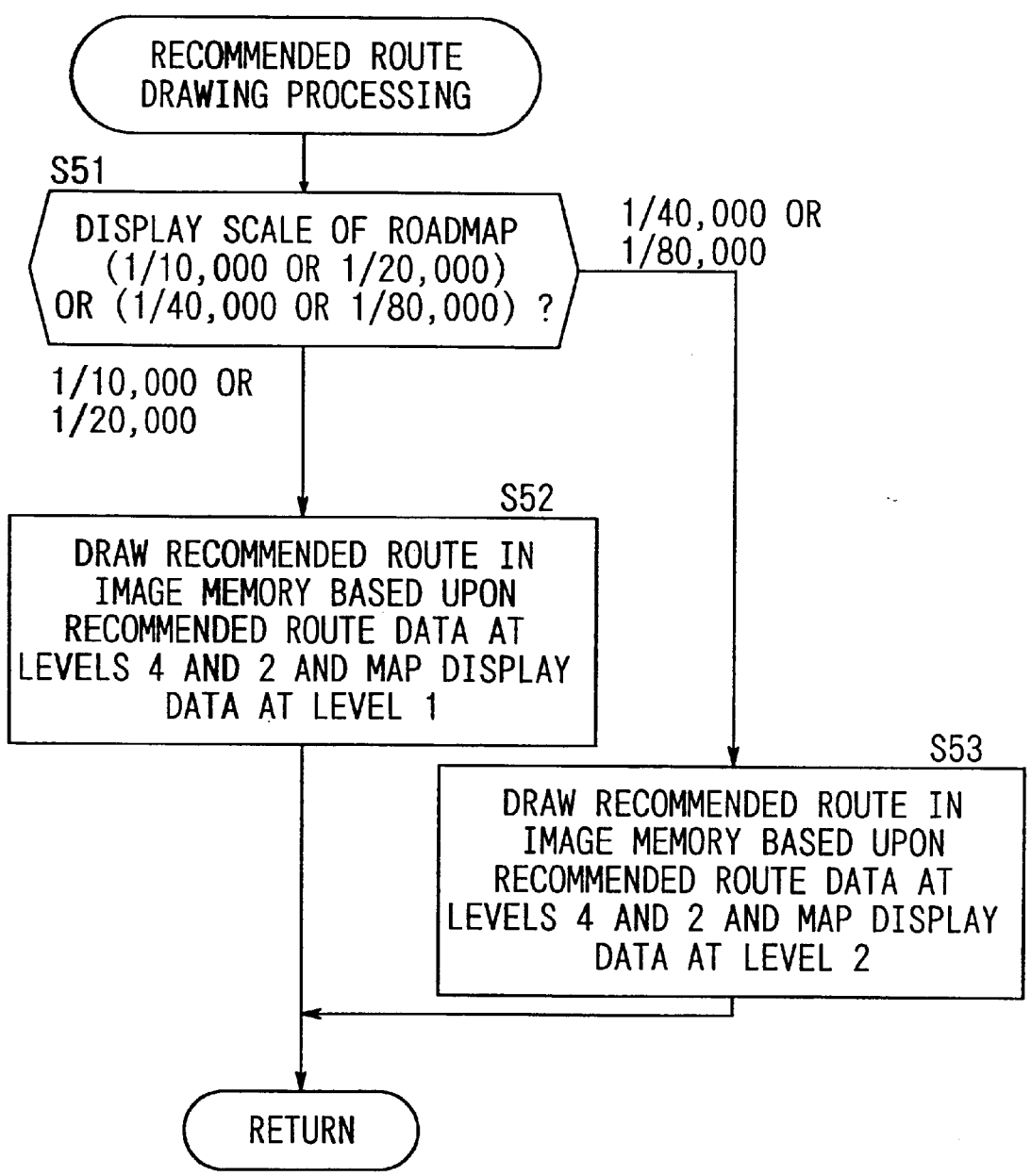
FIG. 22 shows a detailed flowchart illustrating the recommended route drawing processing performed in step S9 in FIG. 20.
Figures 24A, 24B:
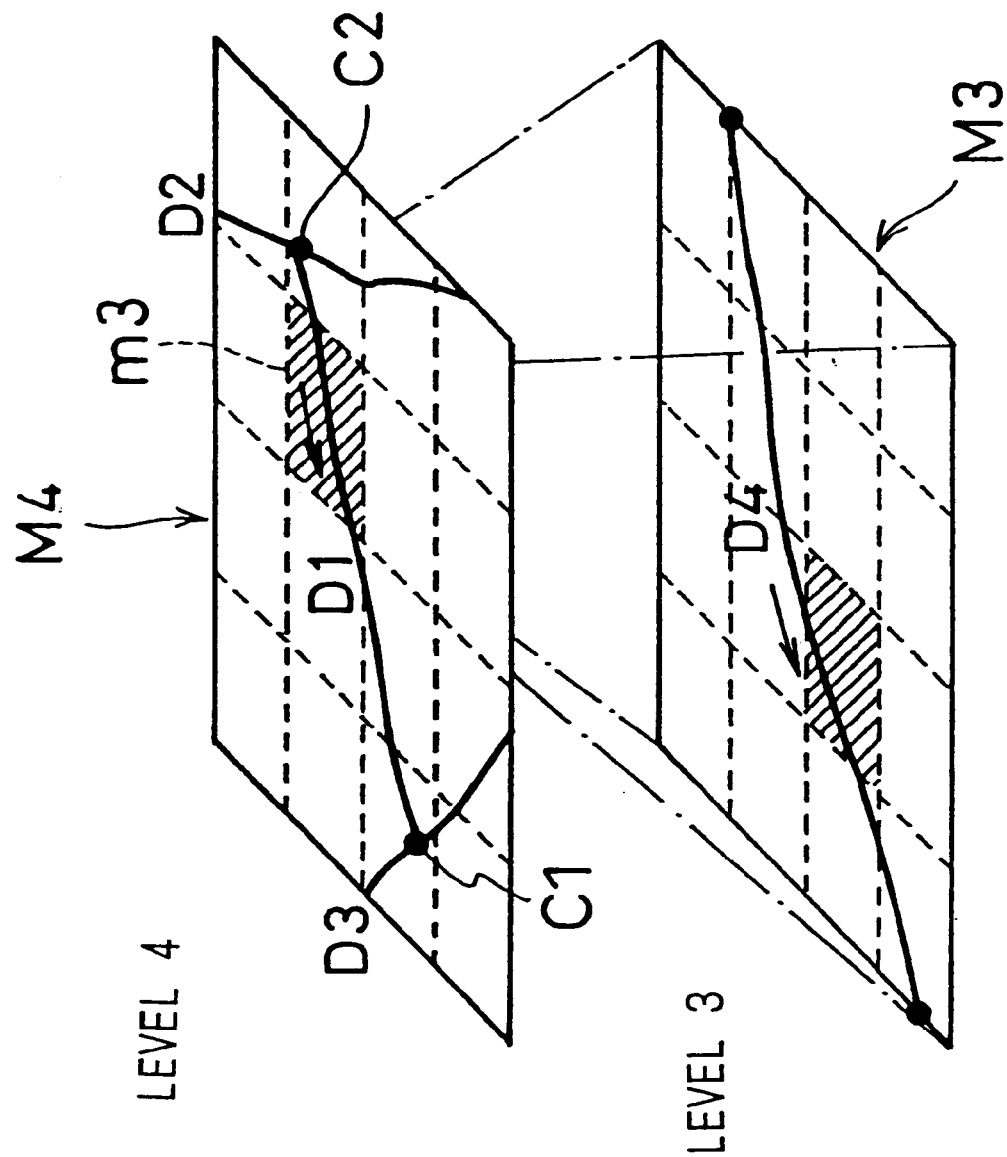
FIGS. 24A and 24B shows a diagram illustrating link strings and links at different levels.

FIG. 22 is a detailed flow chart of the recommended route drawing processing performed in step S9 in FIG. 20. In step S51 in FIG. 22, a decision is made as to whether the display scale of the roadmap is set at ($\frac{1}{10,000}$ or $\frac{1}{20,000}$) or ($\frac{1}{40,000}$ or 1/80,000). If the setting is at (1/10,000 or 1/20,000), the operation proceeds to step S52, in which the recommended route is drawn over (superimposed) in the image memory 5, based upon the recommended route data at levels 4 and 2 and the map display data at level 1.

If, on the other hand, a decision is made in step S51 that the scale is set at (1/40,000 or 1/80,000), the operation proceeds to step S53, in which the recommended route is drawn over in the image memory 5 based upon the recommended route data at levels 4 and 2 and the map display data at level 2.

As shown in FIG. 16, the route search data and the recommended route data in this embodiment hold only the connection information on link connections and do not hold information in regard to road physical form. Consequently, in order to draw a recommended route superimposed upon the roadmap on the monitor, it is necessary to extract the physical form data from the roadmap data based upon the recommended route data. FIG. 23 illustrates the procedure that is followed in order to display the recommended route on the monitor based upon the recommended route data.

FIG. 23A shows recommended route data at level 4 in which the link 1 constituting the link string 1 is present between the front end node N0 and the rear end node N1. FIG. 23B illustrates the recommended route data at level 2 and the recommended route display data for which the physical form data are extracted from the roadmap display data at level 2 based upon the recommended route data at level 2, to be drawn as level 2 data in the image memory 5. In FIG. 23B the link string 1 comprises the link 1 located between the nodes N0 and Na and the link 2 located between the nodes Na and N1. FIG. 20C illustrates in detail the procedure taken for extracting the physical form data from the roadmap display data at level 1 based upon the recommended route data at level 4 or level 2 and drawing them as level 1 data in the image memory 5.

When the operation proceeds from step S51 to step S53 in FIG. 22, i.e., when drawing the recommended route on the roadmap at level 2 based upon the recommended route data at levels 4 and 2, the coordinate values of the node N0, the interpolation point Hb, the node Na, the interpolation point Hc and the node N1 constituting the link string 1, as shown in FIG. 23B, are read out by referencing the roadmap display data at level 2, with a level correlation link number "4-1", (stored as information for the front end node in the link string 1) in the recommended route data illustrated in FIG. 23B used as a pointer. Then, the link string corresponding to the link 1 and the link 2 in the recommended route data is drawn on the roadmap at level 2 drawn in the image memory 5.

When the operation proceeds from step S51 to step S52 in FIG. 22, i.e., when drawing the recommended route on the roadmap at level 1 based upon the recommended route data at levels 4 and 2, the coordinate values of the node N0, the interpolation point Hd, the interpolation point He, the node Nb, the interpolation point Hf and the node Nc constituting the link string 1 and the coordinate values of the node Nc, the interpolation point Hg, the interpolation point Hh, the interpolation point Hi and the node N1 constituting the link string 2, as shown in FIG. 23C, are read out by referencing the roadmap display data at level 1, with a level correlation link number "4-1" in the recommended route data illustrated in FIG. 23B used as a pointer. Then, the link strings corresponding to the link 1 and the link 2 in the recommended route data is drawn on the roadmap at level 1 and drawn in the image memory 5.

Figure 27:
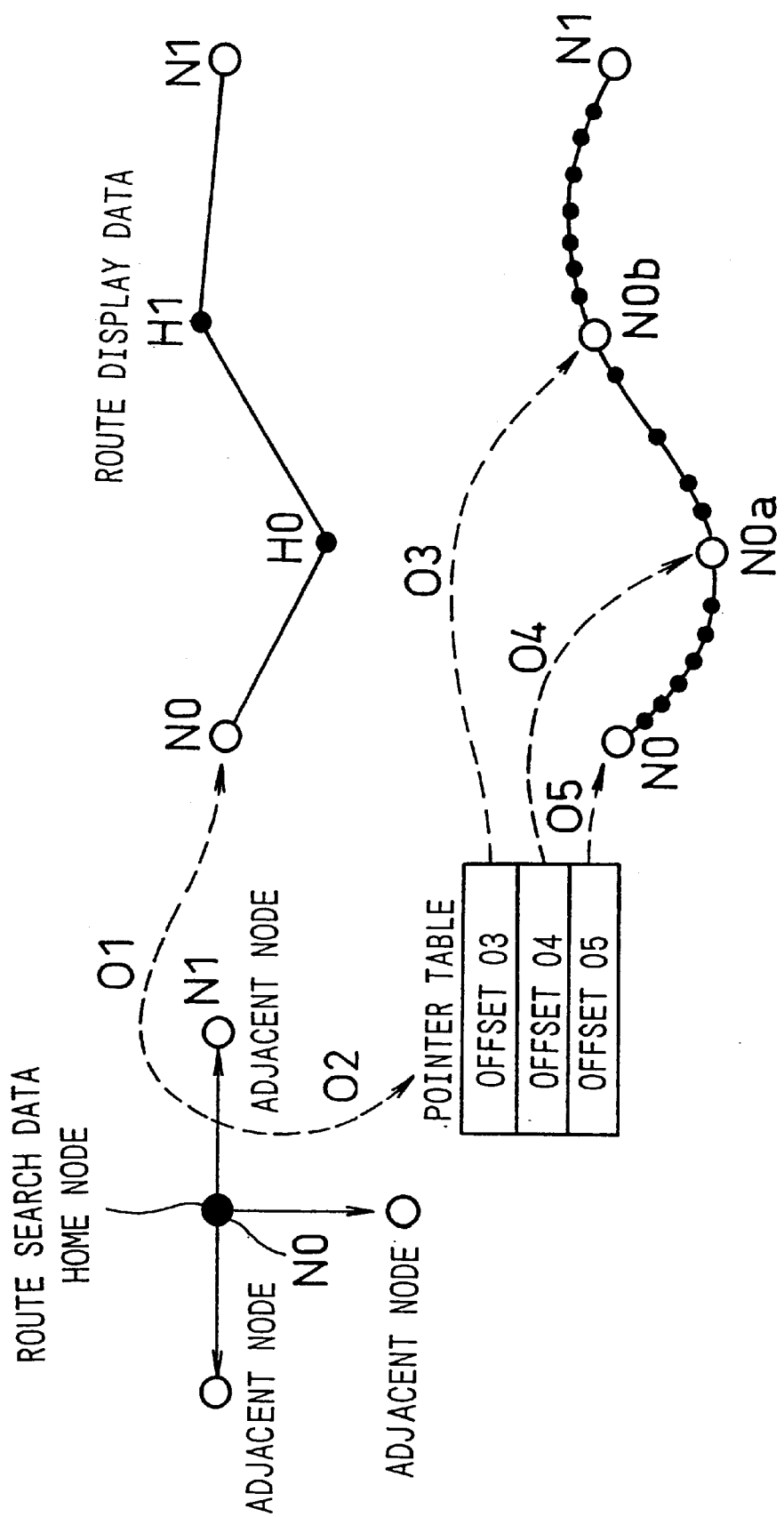
FIG. 27 shows the relationship between route search data and route display data in the prior art.

In contrast, in a map database apparatus in the prior art, the route search data hold the address offset information for the route display data, as shown in FIG. 27, instead of the level correlation link number, as in the present invention, and the physical form data are added to the recommended route data, which do not have any physical form data, to create route display data which are superimposed upon the roadmap at the same level in image memory for drawing. For instance, in the prior art, the route search data hold address offset information 01 for the map display data at the same management level and address offset information 02 for the map display data at the lower order level in regard to a route that connects the home node and an adjacent node N1. Because of this, a problem exists in that the quantity of route search data is large. The address offset information 01 refers to the address in the roadmap display data at the same level, i.e., level 4, where the positional coordinates of the home node N0 are stored in memory and the address offset information 02–05 indicate addresses in the roadmap display data at the lower order level, i.e., level 2, where the positional coordinates of the home node N0 are stored in memory.

Thus, since the road physical form is detected from the roadmap display data by using the level correlation link number in the recommended route data as a pointer in this embodiment, it is not necessary to provide address offset information for route display data in the route search data and neither is it necessary to provide road data to be used exclusively for the route display, thereby achieving a reduction in the quantity of route search data compared to the quantity of route search data in the prior art.

Since map data are provided over a plurality of levels corresponding to different scales and the level correlation link number each including the level number of a higher order level and the corresponding link number in the higher order level, are assigned as the information for a link string in a lower order level which corresponds to the link at the higher order level, the correspondence of identical links at different levels of data of one type and the correspondence of identical links among different types of map data are facilitated.

It is to be noted that the level correlation link number assigned to a link in the recommended route data is identical to the level correlation link number assigned to a corresponding link in the map display data. It is also acceptable that a level correlation link number is assigned to a link in the route search data. In this case, the level correlation link number is identical to the level correlation link number assigned to a corresponding link in the map display data.

What is claimed is:

1. A map database apparatus that stores a plurality of sets of link string data provided separately to correspond to maps at different scales representing a road as a link string constituted by connecting a plurality of links each having a node at a front end and a rear end thereof and, wherein:

a level correlation link number is provided as data that indicate a link string in a lower order level at a larger scale that is common to a link in a higher order level at a smaller scale, said level correlation link number having a level number of said higher order level and a link number of said common link in said higher order level.

2. A map database apparatus according to claim 1, wherein:

node information related to a node connecting adjacent links in said link string data is shared by said adjacent links.

3. A map database apparatus that stores node connection data provided separately to correspond to maps at different scales representing a road as a link string constituted by connecting a plurality of links each having a node at a front end and a rear end thereof, said node connection data representing relationship of connections between nodes, wherein:

said node connection data includes a level correlation link number as data that indicate a link string in a lower order level at a larger scale that is common to a link in a higher order level at a smaller scale, said level correlation link number having a level number of said higher order level and a link number of said common link in said higher order level.

4. A map database apparatus according to claim 3, further comprising:

a setting device that sets a departure point and a destination point on the map;

a calculation device that calculates a recommended route between the departure point and the destination point set by said setting device based upon said node connection data, wherein;

data of said calculated recommended route includes said level correlation link number.

5. A map database apparatus according to claim 4, further storing a plurality of sets of link string data provided separately to correspond to maps at different scales, and further comprising:

a display device that displays a map based upon said link string data; and a control device that controls said display device so that said calculated recommended route is superimposed over said displayed map and displayed, wherein:

said data of the calculated recommended route include said level correlation link number that corresponds to said level correlation link number included in said link string data as to corresponding link string; and said control device makes correspondence among said data of the calculated recommended route and said link string data by using said level correlation link number when said calculated recommended route is superimposed over said displayed map and displayed.

* * * * *